US011966177B2

(12) United States Patent
Kikuchi

(10) Patent No.: US 11,966,177 B2
(45) Date of Patent: *Apr. 23, 2024

(54) IMAGE FORMING APPARATUS AND IMAGE FORMING METHOD

(71) Applicant: TOSHIBA TEC KABUSHIKI KAISHA, Tokyo (JP)

(72) Inventor: Kazuhiko Kikuchi, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 17/727,807

(22) Filed: Apr. 25, 2022

(65) Prior Publication Data

US 2022/0244665 A1 Aug. 4, 2022

Related U.S. Application Data

(63) Continuation of application No. 17/113,107, filed on Dec. 7, 2020, now Pat. No. 11,340,543, which is a (Continued)

(30) Foreign Application Priority Data

Feb. 8, 2019 (JP) ................................ 2019-021850

(51) Int. Cl.
*G03G 15/20* (2006.01)

(52) U.S. Cl.
CPC ..... *G03G 15/2039* (2013.01); *G03G 15/2053* (2013.01); *G03G 15/2064* (2013.01)

(58) Field of Classification Search
CPC ............ G03G 15/2039; G03G 15/205; G03G 15/5004; G03G 2215/2016; G03G 2215/2029
See application file for complete search history.

(56) References Cited

U.S. PATENT DOCUMENTS

| | | | |
|---|---|---|---|
| 5,899,599 A | 5/1999 | Kato |
| 6,496,665 B2 | 12/2002 | Umezawa et al. |

(Continued)

FOREIGN PATENT DOCUMENTS

| | | |
|---|---|---|
| JP | 2004-296188 A | 10/2004 |
| JP | 2018-173536 A | 11/2018 |

OTHER PUBLICATIONS

Notice of Reasons for Refusal dated Jun. 7, 2022 in corresponding Japanese Patent Application No. 2019-021850, 14 pages (with Translation).

*Primary Examiner* — Benjamin R Schmitt
(74) *Attorney, Agent, or Firm* — Kim & Stewart LLP

(57) ABSTRACT

An image forming apparatus includes a fixing unit including a heater including a first surface and a second surface opposite to the first surface, a fixing belt having a surface to which a lubricant is applied and contacting the first surface through the lubricant, a heat conductor contacting the second surface, and a pressing roller capable of pressing and rotating the fixing belt, a power supply configured to supply electric power to the heater, a first thermometer configured to measure temperature of the heat conductor, and a controller configured to determine a first amount of electric power to be supplied to the heater based on the temperature of the heat conductor, and control the power supply to supply the determined first amount of electric power to the heater, before controlling the pressing roller to start rotation.

20 Claims, 14 Drawing Sheets

Related U.S. Application Data continuation of application No. 16/728,612, filed on Dec. 27, 2019, now Pat. No. 10,884,360.

(56) References Cited

U.S. PATENT DOCUMENTS

| | | | |
|---|---|---|---|
| 6,507,008 | B2 | 1/2003 | Nakayama et al. |
| 7,054,573 | B2 | 5/2006 | Hirai et al. |
| 2004/0218943 | A1 | 11/2004 | Hirai et al. |
| 2008/0124098 | A1 | 5/2008 | Yoshimoto |
| 2009/0238597 | A1 | 9/2009 | Cao et al. |

IMAGE FORMING APPARATUS AND IMAGE FORMING METHOD

CROSS-REFERENCE TO RELATED APPLICATIONS

This application is a continuation of U.S. patent application Ser. No. 17/113,107, filed Dec. 7, 2020, which is a continuation of U.S. patent application Ser. No. 16/728,612, filed Dec. 27, 2019, now U.S. Pat. No. 10,884,360 issued on Jan. 5, 2021, which is based upon and claims the benefit of priority from Japanese Patent Application No. 2019-021850, filed on Feb. 8, 2019, the entire contents of which are incorporated herein by reference.

FIELD

Embodiments relate to an image forming apparatus and an image forming method.

BACKGROUND

There are on-demand heating devices such as film fixing units. Such an on-demand heating device drives a film or a fixing belt by a rotating member provided with an elastic layer. In such an on-demand heating apparatus, a lubricant such as grease is applied to the film, so that torque required for driving the film is reduced. However, the viscosity of the lubricant varies depending on the temperature. For this reason, in an on-demand heating apparatus which has not been used for a while, the viscosity of the lubricant becomes high, and a large torque is required for driving the film, which may cause the film not to be driven properly.

DETAILED DESCRIPTION

An image forming apparatus according to an embodiment includes a fixing unit including a heater including a first surface and a second surface opposite to the first surface, a fixing belt having a surface to which a lubricant is applied and contacting the first surface of the heater through the lubricant, a heat conductor contacting the second surface of the heater, and a pressing roller capable of pressing and rotating the fixing belt. The image forming apparatus further includes a power supply configured to supply electric power to the heater, a first thermometer configured to measure a temperature of the heat conductor, and a controller configured to control the power supply. The controller, before controlling the pressing roller to rotate, controls the power supply to supply to the heater: a first amount of electric power when the temperature of the heat conductor is lower than a first value, a second amount of electric power less than the first amount when the temperature of the heat conductor is higher than or equal to the first value and lower than or equal to a second value which is higher than the first value, and a third amount of electric power less than the second amount when the temperature of the heat conductor is higher than the second value.

Hereinafter, an image forming apparatus and an image forming method according to an embodiment will be described with reference to the drawings.

First Embodiment

Figure 1:
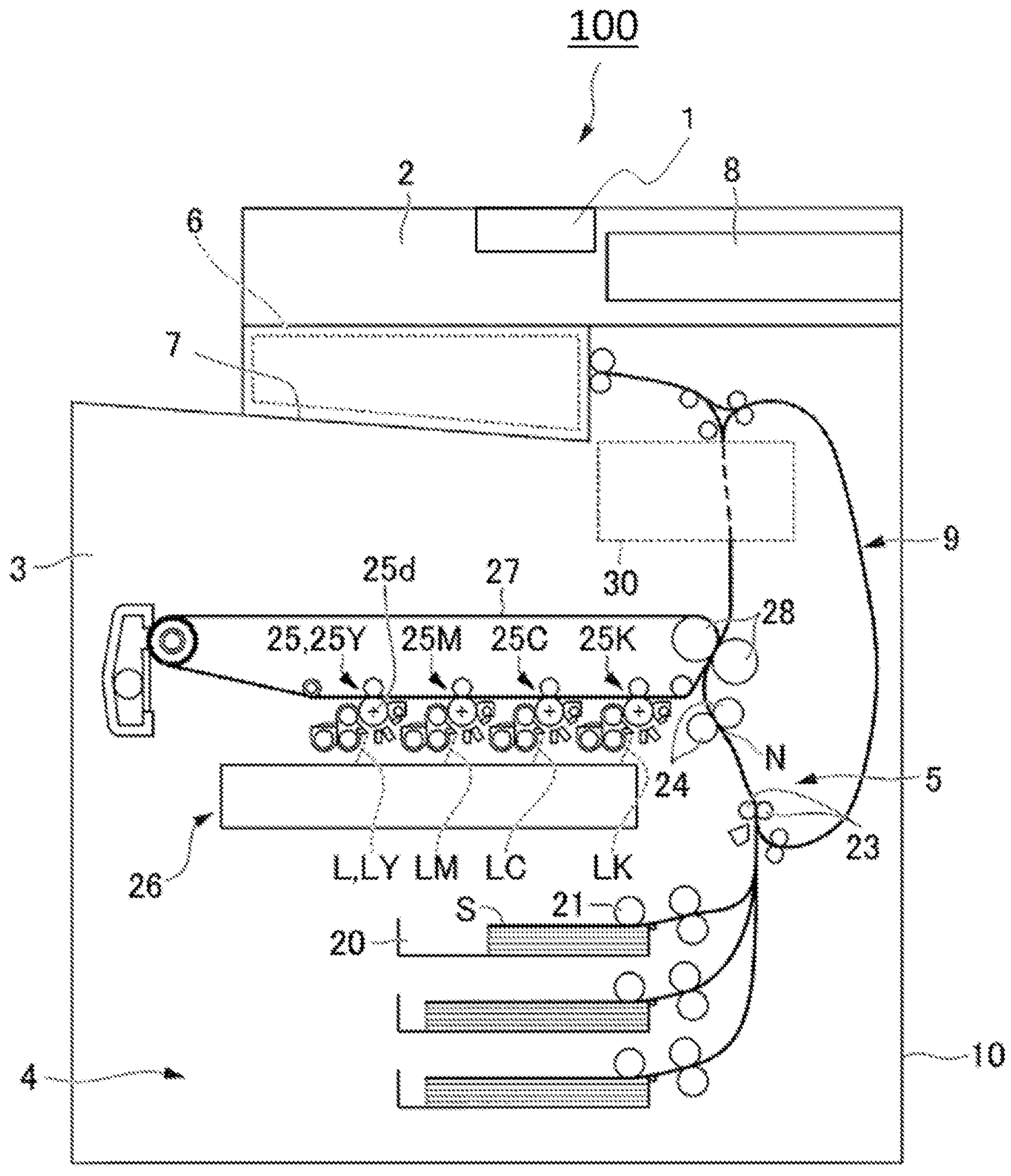
FIG. 1 is a schematic configuration diagram of an image forming apparatus according to a first embodiment.

FIG. 1 is a schematic configuration diagram of an image forming apparatus according to a first embodiment. The image forming apparatus 100 according to the first embodiment is, for example, a multi-functional peripheral. The image forming apparatus 100 includes a housing 10, a display 1, a scanner unit 2, an image forming unit 3, a sheet supply unit 4, a forcing unit 5, a paper discharge tray 7, a reversing unit 9, a control panel 8, and a controller 6. The image forming unit 3 may be an apparatus for fixing a toner image or an ink jet type apparatus. The image forming apparatus 100 forms an image on a sheet S by using a developer such as toner or the like. The sheet may be, for example, printing paper or label paper. The sheet may be any material on which an image can be formed by the image forming apparatus 100.

The housing 10 forms an outer shape of image forming apparatus 100. The display 1 is an image display device such as a liquid crystal display, an organic EL (Electro Luminescence) display, or the like. The display 1 displays various information relating to the image forming apparatus 100. The scanner unit 2 reads the image information from a sheet as the light and dark of the light. The scanner unit records the image information that has been read. The scanner unit 2 outputs the generated image information to the image forming unit 3. The recorded image information may be transmitted to another information processing apparatus via a network.

The image forming unit 3 forms an output image (hereinafter referred to as a toner image) by a recording agent such as toner on the basis of the image information received from the scanner unit 2 or another external device. The image forming unit 3 transfers the toner image onto the surface of the sheet S. The image forming unit 3 heats and pressurizes the toner image on the surface of the sheet S to fix the toner image to the sheet S. The details of the image forming unit 3 will be described later. The sheet S may be supplied by the sheet supply unit 4, or may be supplied manually by a user.

The sheet supply unit 4 supplies the sheet S to the conveying unit 5 one by one in accordance with the timing at which the image forming unit 3 forms the toner image 1. The sheet supply unit 4 includes a sheet storage unit 20 and a pickup roller 21. The sheet storage unit 20 accommodates a sheet S of a predetermined size and type. The pickup roller 21 takes out the sheets S one by one from the sheet storage unit 20. The pickup roller 21 supplies the taken-out sheet S to the conveying unit 5.

The conveying unit 5 conveys the sheet S supplied from the sheet supply unit 4 to the image forming unit 3. The conveying unit 5 includes a conveying roller 23 and a registration roller 24. The conveying roller 23 conveys the sheet S supplied from the pickup roller 21 to the registration roller 24. The conveying roller 23 presses the leading end of the sheet S in the conveying direction against the nip N of the registration roller 24. The registration roller 24 bends the sheet S in the nip N to thereby adjust the position of the leading edge of the sheet S in the conveying direction. The registration roller 24 conveys the sheet S in accordance with the timing at which the image forming unit 3 transfers the toner image to the sheet S.

The details of the image forming unit 3 will be described below. The image forming unit 3 includes a plurality of image forming units 25, a laser scanning unit 26, an intermediate transfer belt 27, a transfer unit 28, and a fixing unit (or a heating device) 30. Each of the image forming units 25 include a photosensitive drum 25*d*. Each of the image forming units 25 forms a toner image corresponding to the image information from the scanner unit 2 or from an external device on the photosensitive drum 25*d*. The plurality of image forming units include image forming units 25Y, 25M, 25C and 25K, which form toner images of yellow, magenta, cyan and black toners, respectively.

A charger, a developing device, and the like are disposed around the photosensitive drum 25*d* of each of the image forming units 25Y, 25M, 25C, and 25K. The charging device charges the surface of the photosensitive drum 25*d*. The developing device of each of the image forming units 25Y, 25M, 25C, and 25K contains developer containing one of yellow, magenta, cyan and black toners. The developing device develops the electrostatic latent image on the photosensitive drum 25*d*. As a result, a toner image formed by the toner of each color is formed on the corresponding photosensitive drum 25*d*.

The laser scanning unit 26 scans the charged photosensitive drum 25*d* with the laser beam L to expose the photosensitive drum 25*d*. The laser scanning unit 26 exposes the photosensitive drums 25*d* of the image forming units 25Y, 25M, 25C and 25K of the respective colors with the respective laser beams LY, LM, LC and LK. In this manner, the laser scanning unit 26 forms an electrostatic latent image on the photosensitive drum 25*d*.

The toner image on the surface of the photosensitive drum 25*d* is primarily transferred onto the intermediate transfer belt 27. The transfer portion 28 transfers the toner image primarily transferred onto the intermediate transfer belt 27 onto the surface of the sheet S at the secondarily transfer position. The fixing unit 30 heats and pressurizes the toner image transferred to the sheet S to fix the toner image on the sheet S. The details of the fixing unit 30 will be described later.

The reversing unit 9 inverts the sheet S to form an image on the back surface of the sheet S. The reversing unit 9 reverses the sheet S discharged from the fixing unit 30 by switch-back. The reversing unit 9 conveys the reversed sheet S toward the registration roller 24. The sheet discharge tray 7 mounts the sheet S that has been ejected with an image formed thereon. The control panel 8 comprises a plurality of buttons. The control panel 8 accepts the operation of the user. The control panel 8 outputs a signal corresponding to the operation performed by the user to the controller 6 of the image forming apparatus 100. The display 1 and control panel 8 may be integrated into a single touch panel. The controller 6 controls each of the components installed in the image forming apparatus 100. The details of the controller 6 will be described later.

Figure 2:
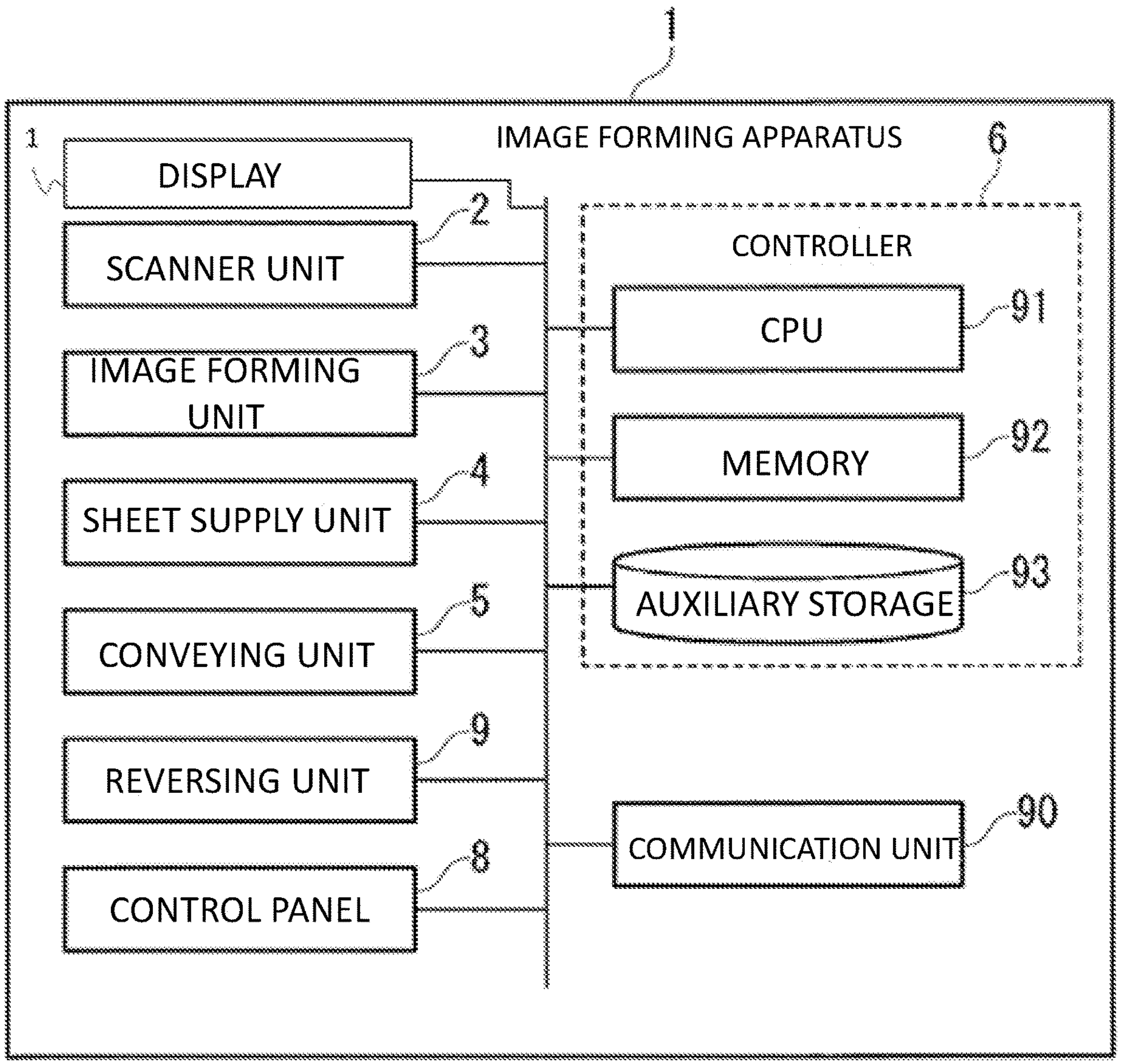
FIG. 2 is a hardware configuration diagram of the image forming apparatus according to the first embodiment.

FIG. 2 is a hardware configuration diagram of the image forming apparatus 100 according to the first embodiment. The image forming apparatus 100 includes a CPU (Central Processing Unit) 91, a memory 92, and an auxiliary storage device 93 connected to each other via a bus, and executes programs. As described above, the image forming apparatus 100 includes the scanner unit 2, the image forming unit 3, the sheet supply unit 4, the forcing unit 5, the reversing unit 9, the control panel 8, and a communication unit 90.

The CPU 91 is a component of the controller 6 and executes programs stored in the memory 92 and the auxiliary storage device 93 to control the operation of each component of the image forming apparatus 100. The auxiliary storage device 93 is a storage device such as a magnetic hard disk device or a semiconductor storage device. The auxiliary storage device 93 stores various kinds of information related to the image forming apparatus 100. The communication unit 90 includes a communication interface for communicating with an external device.

Figure 3:
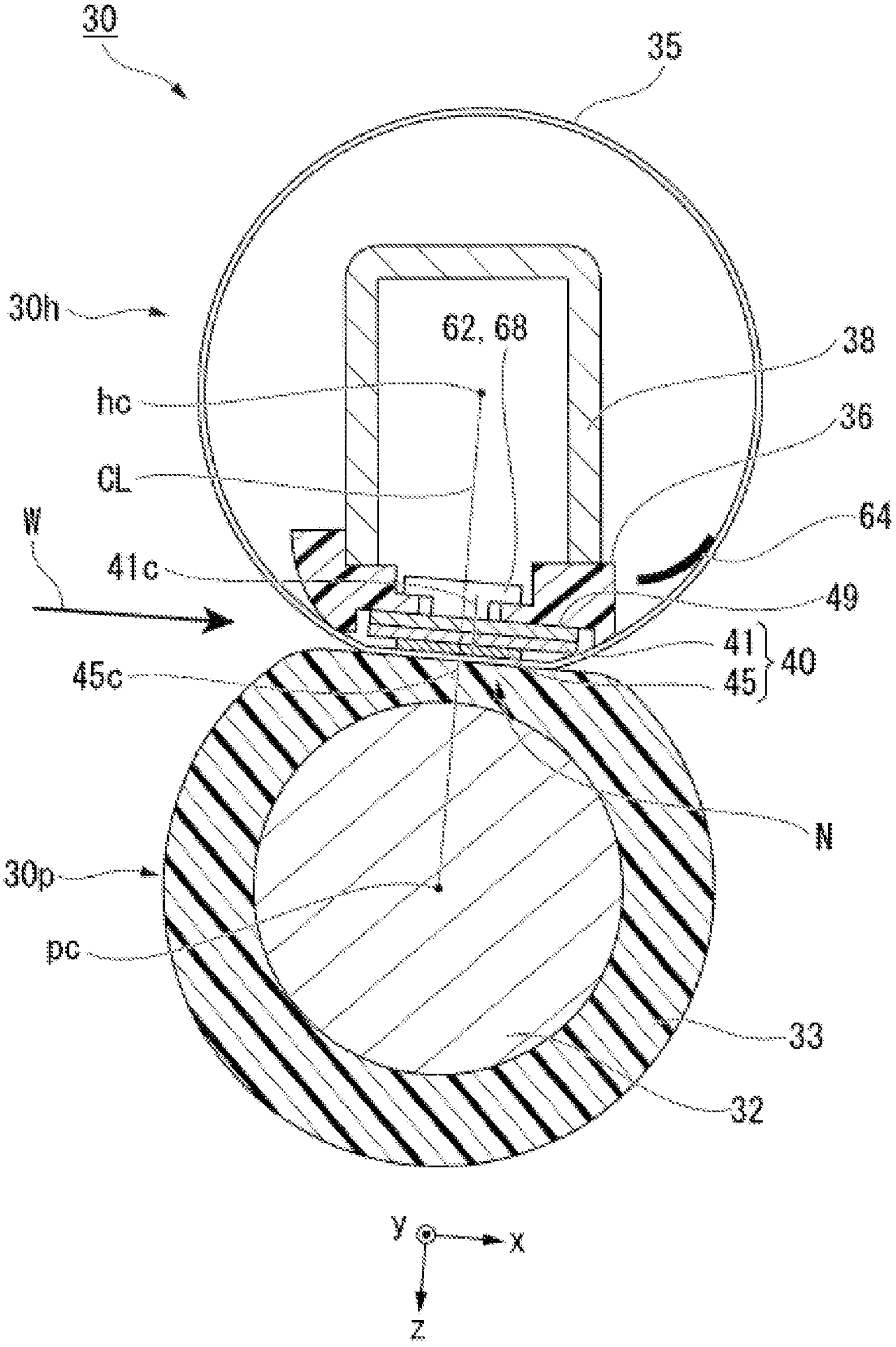
FIG. 3 is a front sectional view of a fixing unit according to the first embodiment.

The fixing unit 30 will be described in detail. FIG. 3 is a front sectional view of the fixing unit 30 according to the first embodiment. The fixing unit 30 includes a pressing roller 30*p* and a film unit 30*h*.

The pressing roller 30*p* forms a nip N with the film unit 30*h*. The pressing roller 30*p* pressurizes the toner image on the sheet S that has entered into the nip N. The pressing roller 30*p* rotates and conveys the sheet S. The pressing roller 30*p* includes a core metal 32, an elastic layer 33, and a release layer (not shown). In this way, the pressing roller 30*p* can press and drive the surface of a cylindrical film 35 of the film unit 30*h*.

The core metal 32 is formed in a cylindrical shape by a metal material such as stainless steel or the like. Both end portions in the axial direction of the core metal 32 are supported to be rotatable. The core metal 32 is driven to rotate by a motor (not shown). The core metal 32 comes into contact with a cam member (not shown). The cam member is rotated to move the core metal 32 toward and away from the film unit 30*h*.

The elastic layer 33 is formed of an elastic material such as silicone rubber. The elastic layer 33 is formed to have a constant thickness on the outer peripheral surface of the core metal 32. The release layer (not shown) is formed of a resin material such as PFA (tetrafluoroethylene perfluoroalkyl vinyl ether copolymer). The release layer is formed on the outer peripheral surface of the elastic layer 33. It is preferable that the hardness of the outer peripheral surface of the pressing roller 30*p* is 40°-70° under a load of 9.8N by an ASKER-C hardness meter. As a result, the area of the nip N and the durability of the pressing roller 30*p* are secured.

The pressing roller 30*p* can be moved toward and away from the film unit 30*h* by the rotation of the cam member. When the pressing roller 30*p* is brought close to the film unit 30*h* and pressed by a pressing spring, a nip N is formed. On the other hand, when the sheet S is jammed in the fixing unit 30, the sheet S can be removed by separating the pressing roller 30*p* from the film unit 30*h*. In addition, in a state in which the cylindrical film 35 is stopped to rotate, such as in a sleep state, the pressing roller 30*p* is moved away from the film unit 30*h*, thereby preventing plastic deformation of the cylindrical film 35.

The pressing roller 30*p* is rotated by a motor. When the pressing roller 30*p* rotates in a state where the nip N is formed, the cylindrical film 35 of the film unit 30*h* is driven to rotate. The pressing roller 30*p* conveys the sheet S in the conveying direction W by rotating the sheet S in a state in which the sheet S is placed in the nip N.

The film unit 30*h* heats the toner image of the sheet S that has entered the nip N. The film unit 30*h* includes the cylindrical film 35, a heater unit 40 (more generally referred to herein as a heater), a heat conductor 49, a support member 36, a stay 38, a heater thermometer 62, a thermostat 68, and a film thermometer 64.

The cylindrical film 35 is formed in a cylindrical shape. The cylindrical film 35 includes a base layer, an elastic layer, and a release layer in this order from the inner peripheral side. The base layer is formed in a cylindrical shape by a material such as nickel (Ni) or the like. The elastic layer is laminated and arranged on the outer peripheral surface of the base layer. The elastic layer is formed of an elastic material such as silicone rubber. The release layer is laminated and arranged on the outer peripheral surface of the elastic layer. The release layer is formed of a material such as a PFA resin.

Figure 4:
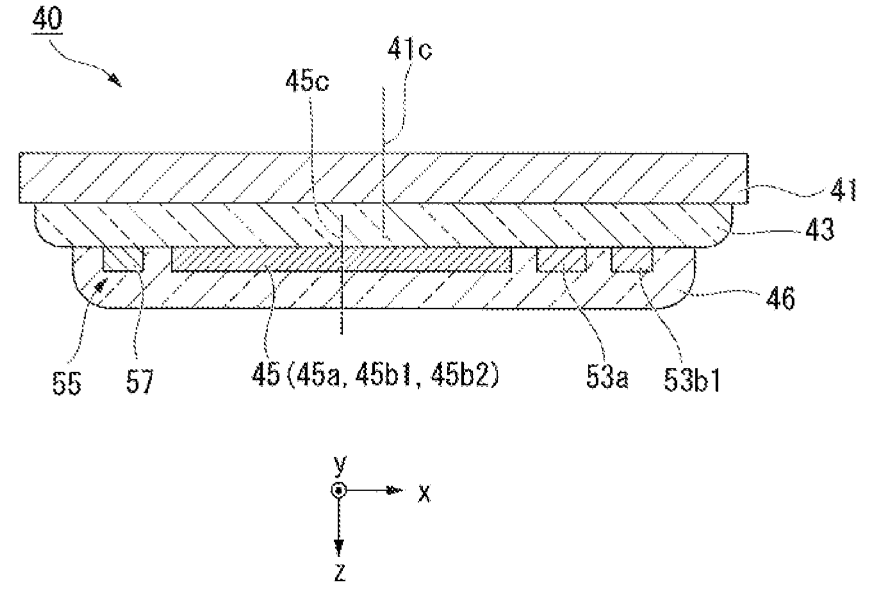
FIG. 4 is a front sectional view of a heater unit of the fixing unit according to the first embodiment.
Figure 5:
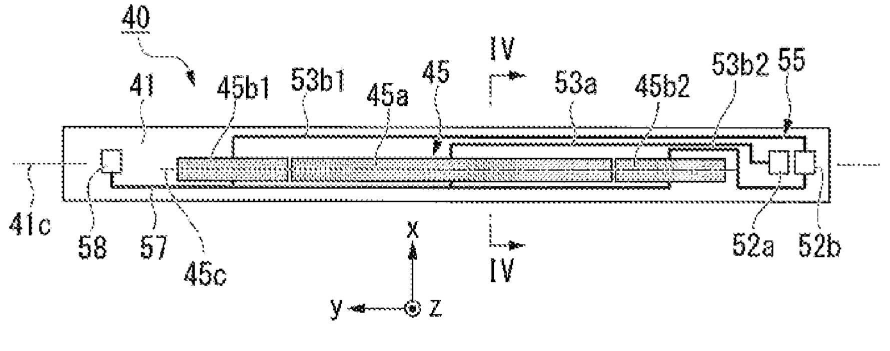
FIG. 5 is a bottom view of the heater unit according to the first embodiment.

FIG. 4 is a front sectional view of the heater unit 40 taken along the line IV-IV in FIG. 5. FIG. 5 is a bottom view of the heater unit 40 (i.e., viewed from the +z direction). The heater unit 40 includes a substrate 41, a heating element set 45, and a ring set 55.

The substrate 41 is made of a metal material such as stainless steel, a ceramic material such as aluminum nitride, or the like. The substrate 41 is formed in a long rectangular plate shape. The substrate 41 is disposed radially inward of the cylindrical film 35. In the substrate 41, the longitudinal direction corresponds to the axial direction of the cylindrical film 35.

In the present application, the x direction, the y direction, and the z direction are defined as follows. The y direction is the longitudinal direction of the substrate 41. The y direction is parallel to the width direction of cylindrical film 35. As will be described later, the +y direction is a direction from the central heating element 45*a* toward the first end heating element 45*b*1. The x direction is the short direction of substrate 41, and the +x direction is the transport direction (i.e., downstream side) of the sheet S. The z direction is the normal direction of the substrate 41, and the +z direction is the direction in which the heating element set 45 is arranged with respect to the substrate 41. An insulating layer 43 is formed on the surface of the substrate 41 in the +z direction by a glass material or the like.

The heating element set 45 is arranged on the substrate 41. The heating element set 45 is formed on the surface of the insulating layer 43 in the +z direction, as shown in FIG. 4. The heating element set 45 is formed of a silver-palladium alloy or the like. The heating element set 45 has a rectangular shape in which the y direction is the longitudinal direction and the x direction is the short direction.

As shown in FIG. 5, the heating element set 45 includes a first end heating element 45*b*1, a central heating element 45*a*, and a second end heating element 45*b*2 arranged side by side in the y direction. The central heating element 45*a* is disposed in the central portion of the heating element set 45 in the y direction. The central heating element 45*a* may be formed by combining a plurality of small heating elements arranged side by side in the y direction. The first end heating element 45*b*1 is located on the +y direction side of the central heating element 45*a*, and is positioned at the end of the heating element set 45 in the +y direction. The second end heating element 45*b*2 is located in the −y direction of the central heating element 45*a* and at the end of heating element set 45 in the −y direction. The boundary line between the central heating element 45*a* and the first end heating element 45*b*1 may be arranged parallel to the x direction, or may be arranged to intersect the x direction. The same applies to the boundary line between the central heating element 45*a* and the second end heating element 45*b*2.

The heating element set 45 generates heat by energization. The electrical resistance value of the central heating element 45*a* is smaller than the electrical resistance value of the first end heating element 45*b*1 and the second end heating element 45*b*2.

The sheet S having a small width in the y direction passes through the center portion in the y direction of the fixing unit 30. In this case, the controller 6 causes only the central heating element 45*a* to generate heat. On the other hand, in the case of the sheet S having a large width in the y direction, the controller 6 generates heat in the entirety of the heating element set 45. Therefore, the central heating element 45*a* and the first end heating element 45*b*1 and the second end heating element 45*b*2 are controlled in heat generation independently of each other. Also, the heat generation is controlled in the first end heating element 45*b*1 and the second end heating element 45*b*2.

The wiring set 55 is made of a metal material such as silver. The wiring set 55 includes a central contact 52*a*, a central portion wiring 53*a*, an end contact 52*b*, a first end wiring 53*b*1, a second end wiring 53*b*2, a common contact 58, and a common ring 57.

The central contact 52*a* is arranged on the −y direction side of the heating element set 45. The central portion wiring 53*a* is arranged on the +x direction side of the heating element set 45. The central portion wiring 53*a* connects the side in the +x direction of the central heating element 45*a* and the center portion contact 52*a*.

The end contact 52*b* is arranged on the −y direction side of the center contact 52*a*. The first end wiring 53*b*1 extends along the side in the +x direction of the heating element set 45 and on the +x direction side of the central portion wiring 53*a*. The first end wiring 53*b*1 connects the end of the first end heating element 45*b*1 in the +x direction and the end of the end contact 52*b* in the +x direction. The second end wiring 53*b*2 extends along the side in the +x direction of the heating element set 45 and on the −x direction side of the central portion wiring 53*a*. The second end wiring 53*b*2 connects the end of the second end heating element 45*b*2 in the +x direction and the end of the end contact 52*b* in the −x direction.

The common contact 58 is arranged at the end in the +y direction of the heating element set 45. The common wiring 57 extends along the side in the −x direction of the heating element set 45. The common ring 57 connects the end sides in the −x direction of the central heating element 45*a*, the first end heating element 45*b*1, and the second end heating element 45*b*2, and the common contact 58.

In this manner, the second end wiring 53*b*2, the center portion wiring 53*a* and the first end portion wiring 53*b*1 extend along the side in the +x direction of the heating element set 45. In contrast, only the common wiring 57 extends along the side in the −x direction of the heating element set 45. Therefore, the center 45*c* in the x direction of the heating element set 45 is arranged on the −x direction side with respect to the center 41*c* in the x direction of the substrate 41.

As shown in FIG. 3, a straight line CL connecting the center pc of the pressing roller 30*p* and the center hc of the film unit 30*h* is defined. The center 41*c* in the x direction of the substrate 41 is arranged in the +x direction from the straight line CL. Thus, the substrate 41 extends in the +x direction of the nip N, so that the sheet S that has passed through the nip N is easily peeled off from the film unit 30*h*.

The center 45*c* of the heating element set 45 in the x direction is disposed on the straight line CL. The heating element set 45 is contained entirely within the region of the nip N and is located at the center of the nip N. Thus, the heat distribution of the nip N becomes uniform, and the sheet S passing through the nip N is uniformly heated.

As shown in FIG. 4, a heating element set 45 and a ring set 55 are formed on the surface of the insulating layer 43 in the +z direction. A protective layer 46 is formed of a glass material or the like so as to cover the heating element set 45 and the ring set 55. The protective layer 46 improves the sliding property between the heater unit 40 and the cylindrical film 35.

As shown in FIG. 3, the heater unit 40 is disposed inside the cylindrical film 35. A lubricant (not shown) is applied to the inner peripheral surface of the cylindrical film 35. The heater unit 40 is in contact with the inner peripheral surface of the cylindrical film 35 through the lubricant. When the heater unit 40 generates heat, the viscosity of the lubricant decreases. Thus, the sliding property between the heater unit 40 and the cylindrical film 35 is secured.

In this manner, the cylindrical film 35 is a band-shape thin film which slides on the surface of the heater unit 40 while making contact with the heater unit 40 on one side.

The heat conductor 49 is formed of a metal material having a high thermal conductivity, such as copper. The outer shape of the heat conductor 49 is equivalent to the outer shape of the substrate 41 of the heater unit 40. The heat conductor 49 is disposed in contact with the surface of the heater unit 40 in the −z direction.

The support member 36 is made of a resin material such as a liquid crystal polymer. The support member 36 is disposed so as to cover the side in the −z direction of the heater unit 40 and the both sides in the x direction of the heater unit 40. The support member 36 supports the heater unit 40 via a heat conductor 49. Rounded chamfering is formed at both end portions in the x direction of the support member 36. The support member 36 supports the inner peripheral surface of the cylindrical film 35 at both end portions in the x direction of the heater unit 40.

When the sheet S passing through the fixing unit 30 is heated, a temperature distribution is generated in the heater unit 40 in accordance with the size of the sheet S. When the heater unit 40 becomes locally high temperature, there is a possibility that the heat resistance temperature of the support member 36 made of a resin material exceeds the heat resistance temperature. The heat conductor 49 averages the temperature distribution of the heater unit 40. As a result, heat resistance of the support member 36 is ensured.

The stay 38 is formed of a steel sheet material or the like. A cross section perpendicular to the y direction of the stay 38 is formed in a U shape. The stay 38 is mounted on the surface in the −z direction of the support member 36 so as to block the opening of the U shape by the support member 36. The stay 38 extends in the y direction. Both ends of the stay 38 in the y direction are fixed to the housing of the image forming apparatus 100. As a result, the film unit 30*h* is supported by the image forming apparatus 100. The stay 38 improves the bending rigidity of the film unit 30*h*. A flange (not shown) for restricting the movement of the cylindrical film 35 in the y direction is mounted in the vicinity of both end portions in the y direction of the stay 38.

The heater thermometer 62 is arranged in the −z direction of the heater unit 40 with the heat conductor 49 interposed therebetween. For example, the heater thermometer is mounted on and supported by the surface in the −z direction of the support member 36. The temperature sensitive element of the heater thermometer 62 contacts the heat conductor 49 through a hole passing through the support member 36 in the z direction. The heater thermometer 62 measures the temperature of the heater unit 40 via the heat conductor 49.

The thermostat 68 is arranged similarly to the heater thermometer 62. The thermostat 68 is incorporated into an electrical circuit, which will be described later. When the temperature of the heater unit 40 detected through the heat conductor 49 exceeds a predetermined temperature, the thermostat 68 cuts off the power supply to the heating element set 45.

Figure 6:
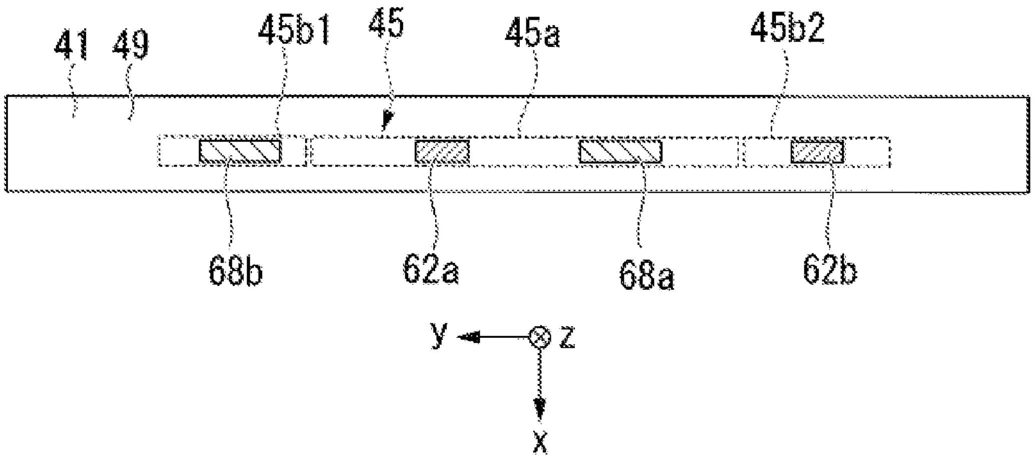
FIG. 6 is a top view of a heater thermometer and a thermostat according to the first embodiment.

FIG. 6 is a top view of the heater thermometer and thermostat (i.e., viewed from the −z direction). In FIG. 6, the description of the supporting member 36 is omitted. The following description of the arrangement of the heater thermometer, thermostat and film thermometer is used to describe the arrangement of the respective temperature sensitive elements.

A plurality of heater thermometers 62 (62*a*, 62*b*) are arranged in the heating element set 45 side by side in the y direction. The plurality of heater thermometers 62 are disposed at the center of the heating element set 45 in the x direction. That is, when viewed from the z direction, the plurality of heater thermometers 62 and the heating element set 45 overlap at least partially. The plurality of thermostats 68 (68*a*, 68*b*) are also arranged in the same manner as the plurality of heater thermometers 62 described above.

The plurality of heater thermometers 62 includes a center heater thermometer 62*a* and an end heater thermometer 62*b*.

The center heater thermometer 62*a* measures the temperature of the central heating element 45*a*. The center heater thermometer 62*a* is positioned within the central heating element 45*a*. That is, when viewed from the z direction, the center heater thermometer 62*a* and the central heating element 45*a* overlap each other.

The end heater thermometer 62*b* measures the temperature of the second end heating element 45*b*2. As described above, the first end heating element 45*b*1 and the second end heating element 45*b*2 are similarly controlled in heat generation. Therefore, the temperature of the first end heating element 45*b*1 and the temperature of the second end heating element 45*b*2 are equal to each other. The end heater thermometer 62*b* is located within a range of second end heating element 45*b*2. That is, the end heater thermometer 62*b* and the second end heating element 45*b*2 overlap each other when viewed from the direction z.

The plurality of thermostats 68 include a central thermostat 68*a* and an end thermostat 68*b*.

The central thermostat 68*a* shuts off energization to the heating element set 45 when the temperature of the central heating element 45*a* exceeds a predetermined temperature. The central thermostat 68*a* is located within the central heating element 45*a*. That is, when viewed from the z direction, the central thermostat 68*a* and the central heating element 45*a* overlap each other.

The end thermostat 68*b* cuts off energization to the heating element set 45 when the temperature of the first end heating element 45*b*1 exceeds a predetermined temperature. As described above, the first end heating element 45*b*1 and the second end heating element 45*b*2 are similarly controlled in heat generation. Therefore, the temperature of the first end heating element 45*b*1 and the temperature of the second end heating element 45*b*2 are equal to each other. The end thermostat 68*b* is located within the first end heating element 45*b*1. That is, when viewed from the z direction, the end thermostat 68*b* and the first end heating element 45*b*1 overlap each other.

As described above, the center heater thermometer 62*a* and the central thermostat 68*a* are disposed within the central heating element 45*a* so as to measure the temperature of central heating element 45*a*. When the temperature of the central heating element 45*a* exceeds the predetermined temperature, the power supply to the heating element set 45 is interrupted. In addition, the end heater thermometer 62*b* and the end thermostat 68*b* are disposed within the first end heating element 45*b*1 and the second end heating element 45*b*2. As a result, the temperature of the first end heating element 45*b*1 and the second end heating element 45*b*2 is measured. When the temperature of the first end heating element 45*b*1 and the second end heating element 45*b*2 exceeds the predetermined temperature, the power supply to the heating element set 45 is interrupted.

The plurality of heaters 62 and the plurality of thermostats 68 are alternately arranged along the y direction. As described above, the first end heating element 45*b*1 is disposed on the +y direction side of the central heating element 45*a*. Within the first end heating element 45*b*1, the end thermostat 68*b* is located. The center heater thermometer 62*a* is arranged on the +y direction side with respect to the center in the y direction of the central heating element 45*a*. The central thermostat 68*a* is arranged on the −y direction side with respect to the center of the central heating element 45*a*. As described above, the second end heating element 45*b*2 is disposed on the −y direction side of the central heating element 45*a*. Within the second end heating element 45*b*2, the end heater thermometer 62*b* is located. Thus, the end thermostat 68*b*, the center heater thermometer 62*a*, the central thermostat 68*a*, and the end heater thermometer 62*b* are arranged in this order in the −y direction.

Generally, the thermostat 68 utilizes a bimetal curved deformation that is accompanied by a temperature change to connect and disconnect electrical circuits. The thermostat is formed to be elongated in conformity to the shape of the bimetal. Terminals extend outward from both end portions in the longitudinal direction of the thermostat 68. Each terminal is connected to a connector of external wiring. Therefore, it is necessary to secure a space outside the thermostat 68 in the longitudinal direction. Since there is no space at both ends in the x direction of the fixing unit 30, the longitudinal direction of the thermostat 68 is arranged along the y direction. In this case, when a plurality of thermostats 68 are arranged adjacent to each other in the y direction, it becomes difficult to secure a connection space of the external wiring.

As described above, the plurality of heaters 62 and the plurality of thermostats 68 are alternately arranged along the y direction. Thus, a heater thermometer 62 is disposed adjacent to each thermostat 68 in the y direction. Therefore, it is possible to secure a space for connecting external wiring to the thermostat 68. In addition, the degree of freedom in the layout in the y direction of the thermostat 68 and the heater thermometer 62 is increased. Thereby, the thermostat 68 and the heater thermometer 62 are arranged at the optimum position to control the temperature of the fixing unit 30. Further, it is easy to separate the alternating current wiring connected to the plurality of thermostats 68 from the direct current wiring connected to the plurality of heater thermometers 62. As a result, noise in the electric circuit is suppressed.

As shown in FIG. 3, the film thermometer 64 is disposed inside the cylindrical film 35 and on the +x direction side of the heater unit 40. The film thermometer 64 contacts the inner peripheral surface of the cylindrical film 35 to measure the temperature of the cylindrical film 35.

Figure 7:
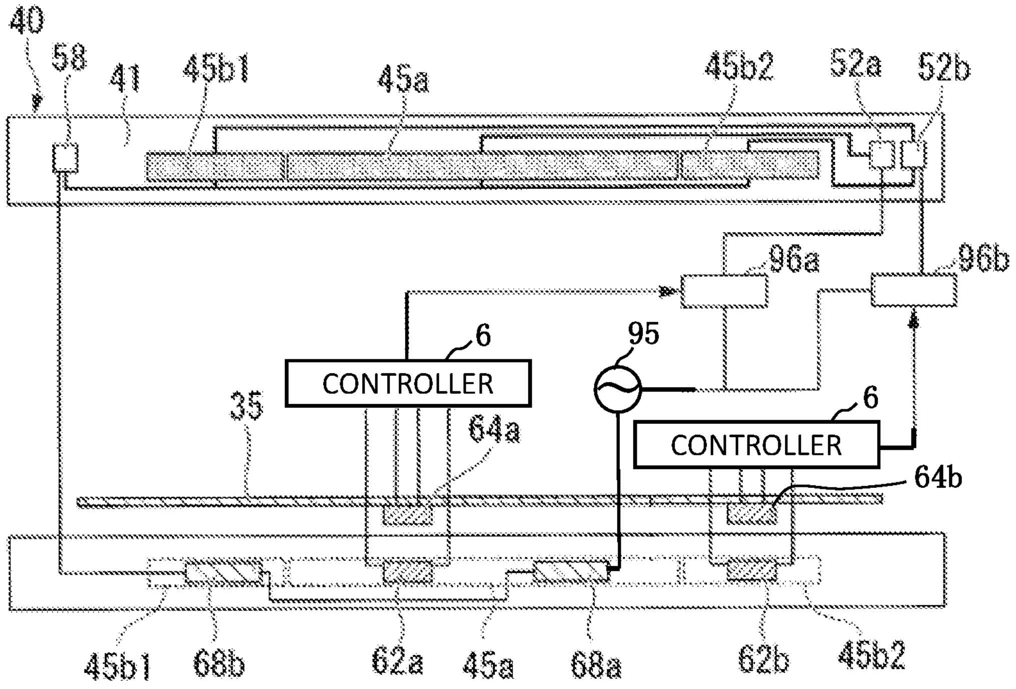
FIG. 7 is an electric circuit diagram of the fixing unit according to the first embodiment.

FIG. 7 is an electric circuit diagram of the heating unit 30 according to the first embodiment. In FIG. 7, the bottom view of the heater unit 40 shown in FIG. 5 is located at the top of FIG. 7, and the plan view of the substrate 41 shown in FIG. 6 is arranged at the bottom of FIG. 7. FIG. 7 also shows a plurality of film thermometers 64 along with a cross section of the cylindrical film 35.

The plurality of film thermometers 64 includes a central film thermometer 64*a* and an end film thermometer 64*b*.

The central film thermometer 64*a* comes into contact with the center portion of the cylindrical film 35 in the y direction. The central film thermometer 64*a* contacts the cylindrical film 35 within the range in the y direction of the central heating element 45*a*. The central film thermometer 64*a* measures the temperature of the central portion in the y direction of the cylindrical film 35.

The end film thermometer 64*b* contacts the end of cylindrical film 35 in the −y direction. The end film thermometer 64*b* contacts the cylindrical film 35 within the range in the y-direction of the second end heating element 45*b*2. The end film thermometer 64*b* measures the temperature at the end in the −y direction of the cylindrical film 35. As described above, the first end heating element 45*b*1 and the second end heating element 45*b*2 are similarly controlled in heat generation. Therefore, the temperature at the end portion in the −y direction of the cylindrical film 35 and the temperature at the end portion in the +y direction are identical.

A power supply 95 is electrically connected to the center contact point 52*a* via a central triac 96*a*. The power supply 95 is electrically connected to the end contact 52*b* via an end triac 96*b*. The controller 6 controls ON/OFF of the central triac 96*a* and the end triac 96*b* independently of each other. When the controller 6 turns on the central triac 96*a*, the power is supplied from the power supply 95 to the central heating element 45*a*. As a result, the central heating element 45*a* generates heat. When the controller 6 turns on the end triac 96*b*, the power is supplied from the power supply 95 to the first end heating element 45*b*1 and the second end heating element 45*b*2. Thus, the first end heating element 45*b*1 and the second end heating element 45*b*2 generate heat. As described above, the central heating element 45*a* and the first end heating element 45*b*1 and the second end heating element 45*b*2 are independently controlled in heat generation. The central heating element 45*a*, the first end heating element 45*b*1 and the second end heating element 45*b*2 are connected in parallel with respect to the power supply 95.

The power supply 95 is electrically connected to the common contact 58 via the central thermostat 68*a* and the end thermostat 68*b*. The central thermostat 68*a* and the end thermostat 68*b* are connected in series. When the temperature of the central heating element 45*a* rises abnormally, the detected temperature of the central thermostat 68*a* exceeds the predetermined temperature. At this time, the central thermostat 68*a* interrupts the power supply from the power supply 95 to the entire heating element set 45.

When the temperature of the first end heating element 45*b*1 rises abnormally, the detected temperature of the end thermostat 68*b* exceeds a predetermined temperature. At this time, the end thermostat 68*b* blocks the power supply from the power supply 95 to the heating element set 45. As described above, the first end heating element 45*b*1 and the second end heating element 45*b*2 are similarly controlled in heat generation. Therefore, when the temperature of the second end heating element 45*b*2 rises abnormally, the temperature of the first end heating element 45*b*1 also increases. Therefore, even when the temperature of the second end heating element 45*b*2 rises abnormally, the end thermostat 68*b* shuts off power supply from the power supply 95 to the entire heating element set 45.

The controller 6 measures the temperature of the central heating element 62*a* by the center heater thermometer 45*a*. The controller 6 measures the temperature of the second end heating element 45*b*2 by the end heater thermometer 62*b*. The temperature of the second end heating element 45*b*2 is equal to the temperature of the first end heating element 45*b*1. The controller 6 measures the temperature of the heating element set 45 by the heater thermometer 62 at the time of starting the fixing unit 30. When the temperature of at least one of the central heating element 45*a* and the second end heating element 45*b*2 is lower than a predetermined temperature, the controller 6 generates heat for a short period of time in the heating element set 45. Thereafter, the controller 6 starts the rotation of the pressing roller 30*p*. The heat generated by the heating element set 45 lowers the viscosity of the lubricant applied to the inner peripheral surface of the cylindrical film 35. Thus, the sliding property between the heater unit 40 and the cylindrical film 35 at the start of the rotation of the pressing roller 30*p* is ensured.

The controller 6 measures the temperature of the central portion of the cylindrical film 35 in the y direction by using the central film thermometer 64*a*. The controller 6 measures the temperature of the end portion of the cylindrical film 35 in the −y direction by the end film thermometer 64*b*. The temperature of the end of the cylindrical film 35 in the −y direction is equal to the temperature of the end of the cylindrical film 35 in the +y direction. The controller 6 measures the temperature of the center portion and the end portion in the y direction of the cylindrical film 35 during the operation of the fixing unit 30. The controller 6 performs phase control or wave number control on the power supplied to the heating element set 45 by the central triac 96*a* and the end triac 96*b*. The controller 6 controls the energization to the central heating element 45*a* based on the temperature measurement result at the center portion in the y direction of the cylindrical film 35. The controller 6 controls the energization of the first end heating element 45*b*1 and the second end heating element 45*b*2 based on the temperature measurement result at the end portion in the y direction of the cylindrical film 35.

When a pre-processing execution condition is satisfied during a pre-processing period, the controller 6 determines a method of energization to the heating element set 45 in the pre-processing period based on the temperature measured by the heater thermometer 62 and the film thermometer 64. Hereinafter, the method in which the heating element set 45 is energized in the pre-processing period is referred to as the pre-processing energization method. The energization of the heating element set 45 means that the central heating element 45*a*, the first end heating element 45*b*1, and the second end heating element 45*b*2 are energized. The pre-processing period is a period from the time when a pre-processing start condition is satisfied to the time when a pre-processing end condition is satisfied. The pre-processing start condition may be any condition, for example, a condition that the image forming apparatus 100 has acquired image information. The preprocessing start condition may be, for example, a condition that an instruction to start the pre-processing is input by the user via the control panel 8 or the communication unit 90. The pre-processing end condition may be any condition, for example, a condition in which all of the temperatures measured by the heater thermometers 62 are equal to or more than a predetermined temperature (hereinafter referred to as a "first pre-processing end condition"). That is, it may be a condition that the lowest temperature among the temperatures measured by a plurality of heaters 62 is equal to or higher than a predetermined temperature. The pre-processing end condition may be, for example, a condition in which a predetermined time elapses after the energization by the pre-processing energization method is started. The pre-processing end condition may be, for example, a condition that the energization of the controller 6 is terminated by the pre-processing energization method.

The controller 6 controls the central triac 96*a* and the end triac 96*b* so that the heating element set 45 is energized by the determined pre-processing energization method (hereinafter called "pre-processing").

The pre-processing execution condition may be any condition as long as it includes a condition that at least one of a pre-processing heater condition and a pre-processing film condition is satisfied. For example, the pre-processing heater condition is a condition that at least one of the temperatures measured by a plurality of heater thermometer is lower than a first heater temperature (hereinafter referred to as "the first pre-processing heater condition"). For example, the pre-processing film condition is a condition that at least one of the temperatures measured by the plurality of film thermometers 64 is lower than the film temperature (hereinafter, referred to as "the first film condition"). The first heater temperature may be, for example, 40° C. The film temperature may be, for example, 40° C.

In order to simplify the description, it is assumed that the pre-processing end condition is a condition that the energization by the pre-processing energization method is terminated.

After the end of the pre-processing period, the controller 6 rotates the pressing roller 30*p*. After the end of the pre-processing period, the controller 6 controls the energization of the heating element set 45 based on the temperature measured by the heater thermometer 62 and the film thermometer 64. Hereinafter, the energization method of the heating element set 45 controlled by the controller 6 after the end of the pre-processing period is referred to as "the post-processing energization method", and the process of executing the post-processing energization method is referred to as "the post-processing. Hereinafter, a period from the end of the pre-processing period to the end of the execution of the post-processing is referred to as a post-processing period. In the post-processing, the controller 6 controls the central triac 96*a* and the end triac 96*b* on the basis of the temperature measured by the film thermometer 64. The controller 6 controls the central triac 96*a* and the end triac 96*b* so that the temperature measured by the film thermometer 64 is maintained at a predetermined temperature.

In the following description of FIGS. 8 and 9, it is assumed that the pre-processing execution condition is satisfied under the condition that at least one of the first pre-processing heater condition and the first pre-processing film condition is satisfied for the sake of simplicity.

Figure 8:
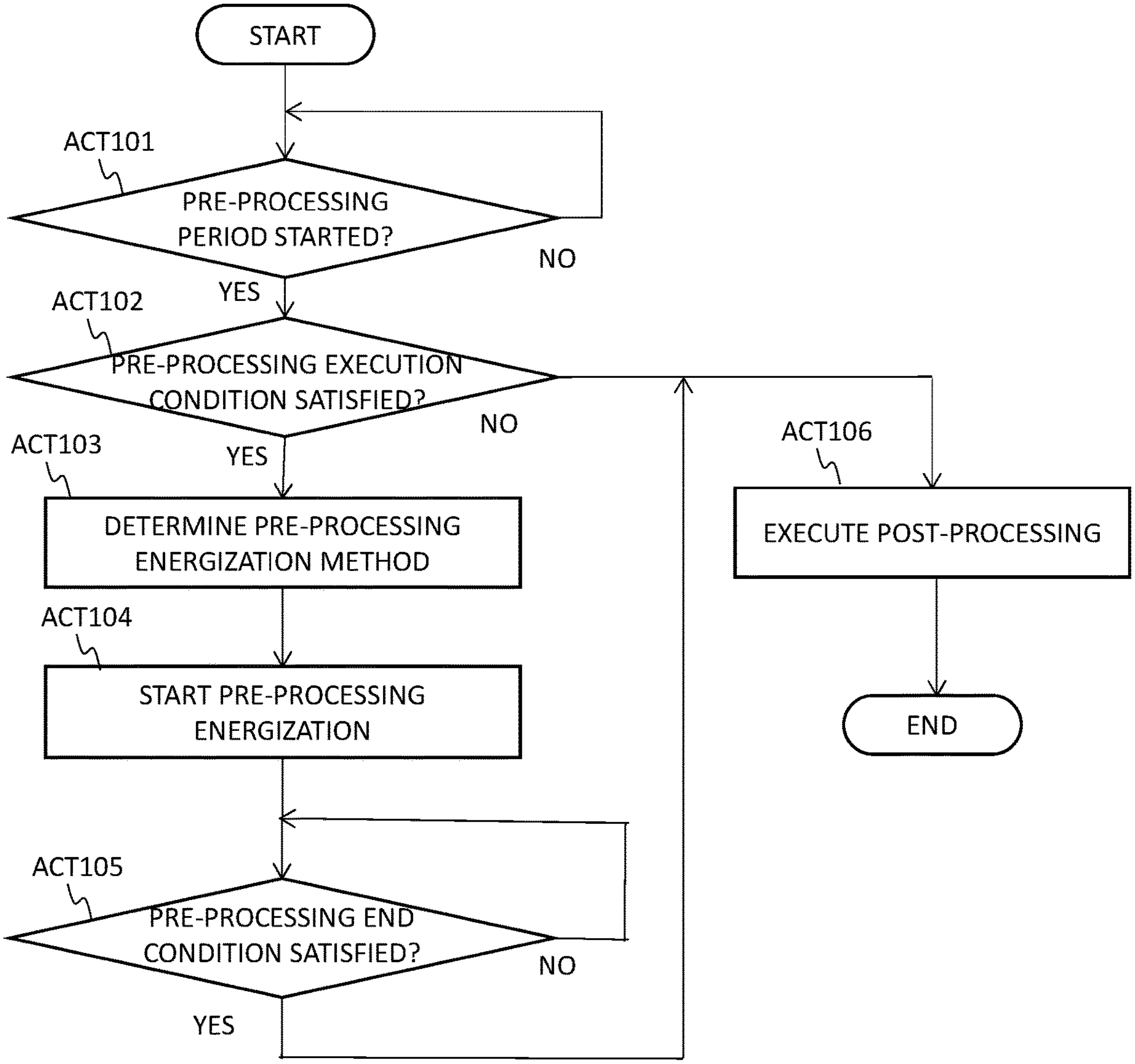
FIG. 8 is a flowchart illustrating processing executed by a controller during a period from the start of the pre-processing period to the execution of the post-processing in the first embodiment.

FIG. 8 is a flowchart showing processing executed by the controller 6 during a period from the start of the pre-processing period to the execution of the post-processing in the first embodiment.

The controller 6 determines whether or not the pre-processing period has been started (ACT 101). Specifically, the controller 6 determines whether or not the pre-processing start condition is satisfied. When the pre-processing period is started (ACT 101, YES), the controller 6 determines whether or not to energize the heating element set 45 in the pre-processing period (ACT 102). Specifically, the controller 6 determines whether or not the pre-processing execution condition is satisfied.

In ACT 102 when the pre-processing execution condition is satisfied (ACT 102, YES), the controller 6 determines the pre-processing energization method based on the temperature measured by the heater thermometer 62 and the film thermometer 64 (ACT 103).

Next to ACT 103, the controller 6 controls the central triac 96*a* and the end triac 96*b* so that the current is supplied to the heating element set 45 through the pre-processing energization method determined in ACT 103 (ACT 104).

The controller 6 determines whether or not the pre-processing period has been completed (ACT 105). More specifically, the controller 6 determines whether or not the pre-processing end condition is satisfied. When the pre-processing end condition is satisfied (ACT 105, YES), the controller 6 starts the execution of the post-processing (ACT 106). On the other hand, in the process of ACT 105, when the preprocessing end condition is not satisfied (ACT 105, NO), the process returns to ACT 105.

On the other hand, in the ACT 102, when the preprocessing execution condition is not satisfied (ACT 102, NO), the controller 6 executes the process of ACT 106.

On the other hand, in the process of ACT 101, when the preprocessing period is not started (ACT 101, NO), the process returns to ACT 101.

Figure 9:
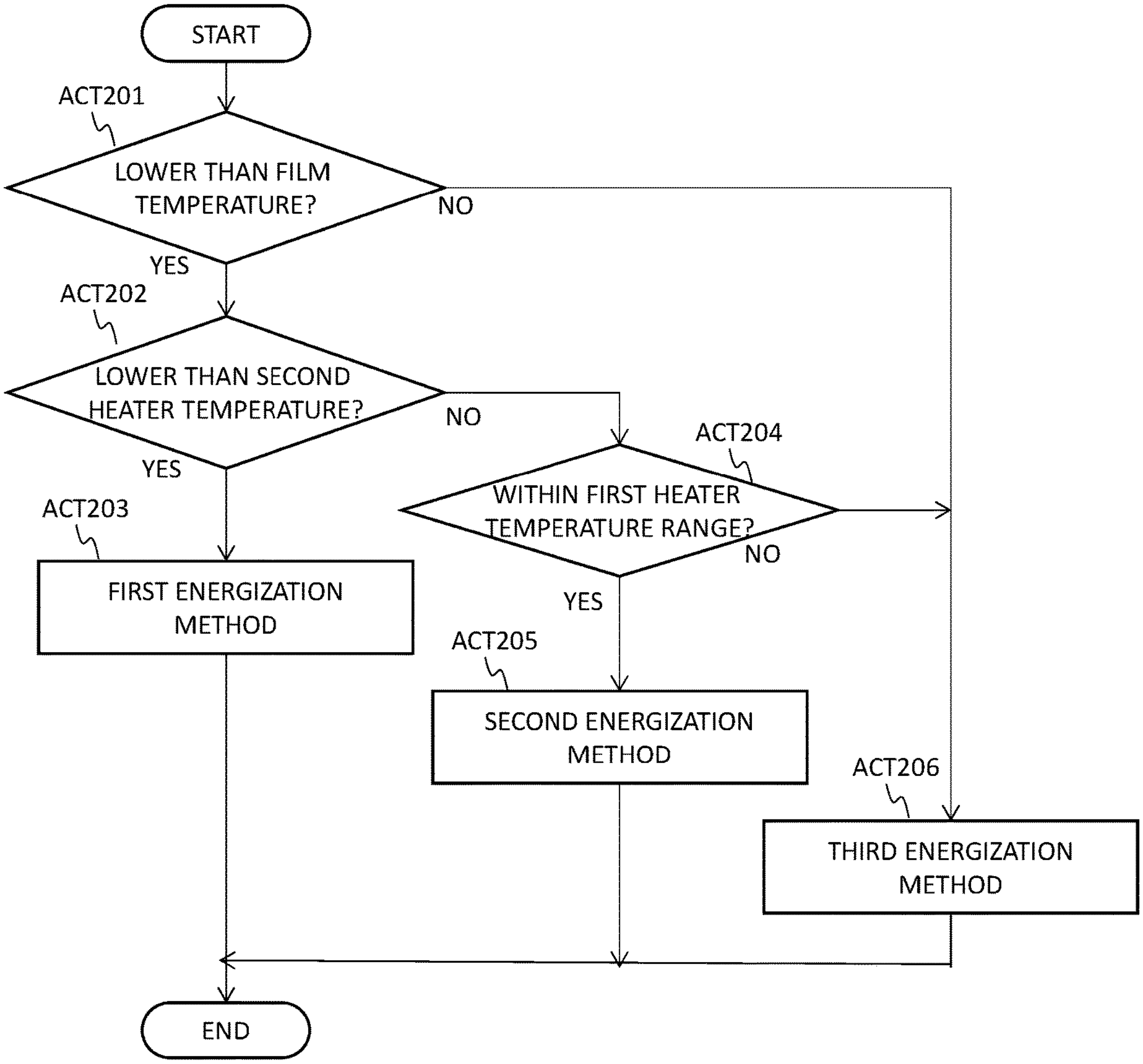
FIG. 9 is a flowchart illustrating processing for determining a pre-processing energization method by the controller according to the first embodiment.

FIG. 9 is a flowchart showing processing for determining the pre-processing energization method by the controller 6 according to the first embodiment.

The controller 6 determines whether or not at least one of the temperatures measured by the film thermometer 64 is lower than the film temperature (ACT 201). When at least one of the temperatures measured by the film thermometer 64 is lower than the film temperature (ACT 201, YES), the controller 6 determines whether or not at least one of the temperatures measured by the heater thermometer 62 is lower than a second heater temperature (ACT 202). The second heater temperature is lower than the first heater temperature. The second heater temperature may be, for example, 20° C. when the first heater temperature is 40° C. When at least one of the temperatures measured by the heater thermometer 62 is lower than the second heater temperature (ACT 202, YES), the controller 6 determines, as the pre-processing energization method, a first energization method (ACT 203). The first energization method is an energization method in which the duty ratio for energization is a first duty ratio and the period in which the current is supplied is a first period. For example, the first duty ratio is 70% and the first period is 0.5 ms.

On the other hand, when all of the temperatures measured by the heater thermometer 62 are equal to or higher than the second heater temperature (ACT 202, NO), the controller 6 determines whether or not all of the temperatures measured by the heater thermometer 62 are within a first heater temperature range (ACT 204). The first heater temperature range is in a range of a temperature equal to or higher than the second heater temperature and lower than a third heater temperature.

When all of the temperatures measured by the heater thermometer 62 are within the first heater temperature range (ACT 204, YES), the controller 6 determines, as the pre-processing energization method, a second energization method (ACT 205). The second energization method is an energization method in which the duty ratio is a second duty ratio and the period in which the current is supplied is a second period. The electric power supplied to the heating element set 45 by the second energization method during the pre-processing period is less than the electric power supplied to the heating element set 45 by the first energization method during the pre-processing period. For example, the power supplied to the heating element set 45 by the second energization method during the pre-processing period may be 5/7 of the power supplied to the heating element set 45 by the first energization method during the pre-processing period. When the first duty ratio is 70% and the first time period is 0.5 ms, for example, the second duty ratio is 50%, and the second period is 0.5 ms.

On the other hand, when at least one of the temperatures measured by the heater thermometer 62 is not within the first heater temperature range (ACT 204, NO), the controller 6 determines, as the pre-processing energization method, a third energization method (ACT 206). The third energization method is an energization method in which the duty ratio is a third duty ratio and the period in which the current is supplied is a third period. The electric power supplied to the heating element set 45 by the third energization method during the pre-processing period is less than the electric power supplied to the heating element set 45 by the second energization method during the pre-processing period. For example, the power supplied to the heating element set 45 by the third energization method during the pre-processing period is 3/5 of the power supplied to the heating element set 45 by the second energization method during the pre-processing period. When the first duty ratio is 70% and the first time period is 0.5 ms, for example, the third duty ratio is 30%, and the third period is 0.5 ms.

On the other hand, in ACT 201, when all of the temperatures measured by the film thermometer 64 are equal to or higher than the film temperature (ACT 201, NO), the controller 6 determines, as the pre-processing energization method, the third energization method (ACT 206).

Figure 10:
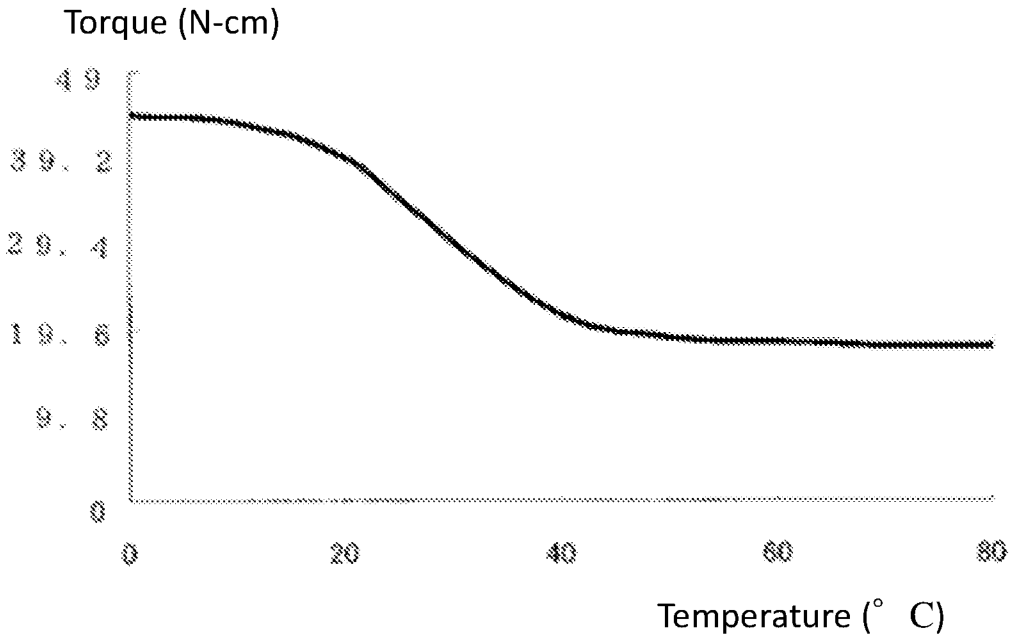
FIG. 10 is a diagram showing a relationship between torque and temperature of the heating element set in the image forming apparatus according to the first embodiment.

FIG. 10 is a diagram showing a relationship between torque and temperature of the heating element set 45 in the image forming apparatus 100 according to the first embodiment. The horizontal axis in FIG. 10 represents the temperature of heating element set 45. The vertical axis in FIG. 10 represents torque. FIG. 10 shows that a higher temperature of the heating element set 45 results in lower torque.

The image forming apparatus 100 of the first embodiment configured as described above includes the controller 6 for controlling the central triac 96*a* and the end triac 96*b* to energize the heating element set 45 before the pressing roller 30*p* is rotated according to the temperature measured by the heater thermometer 62, thereby reducing the viscosity of the lubricant applied to the inner peripheral surface of the cylindrical film 35 before the rotation. Since the image forming apparatus 100 of the first embodiment configured as described above can suppress the occurrence of torque increase, the film can be properly driven regardless of the use state.

Second Embodiment

Figure 11:
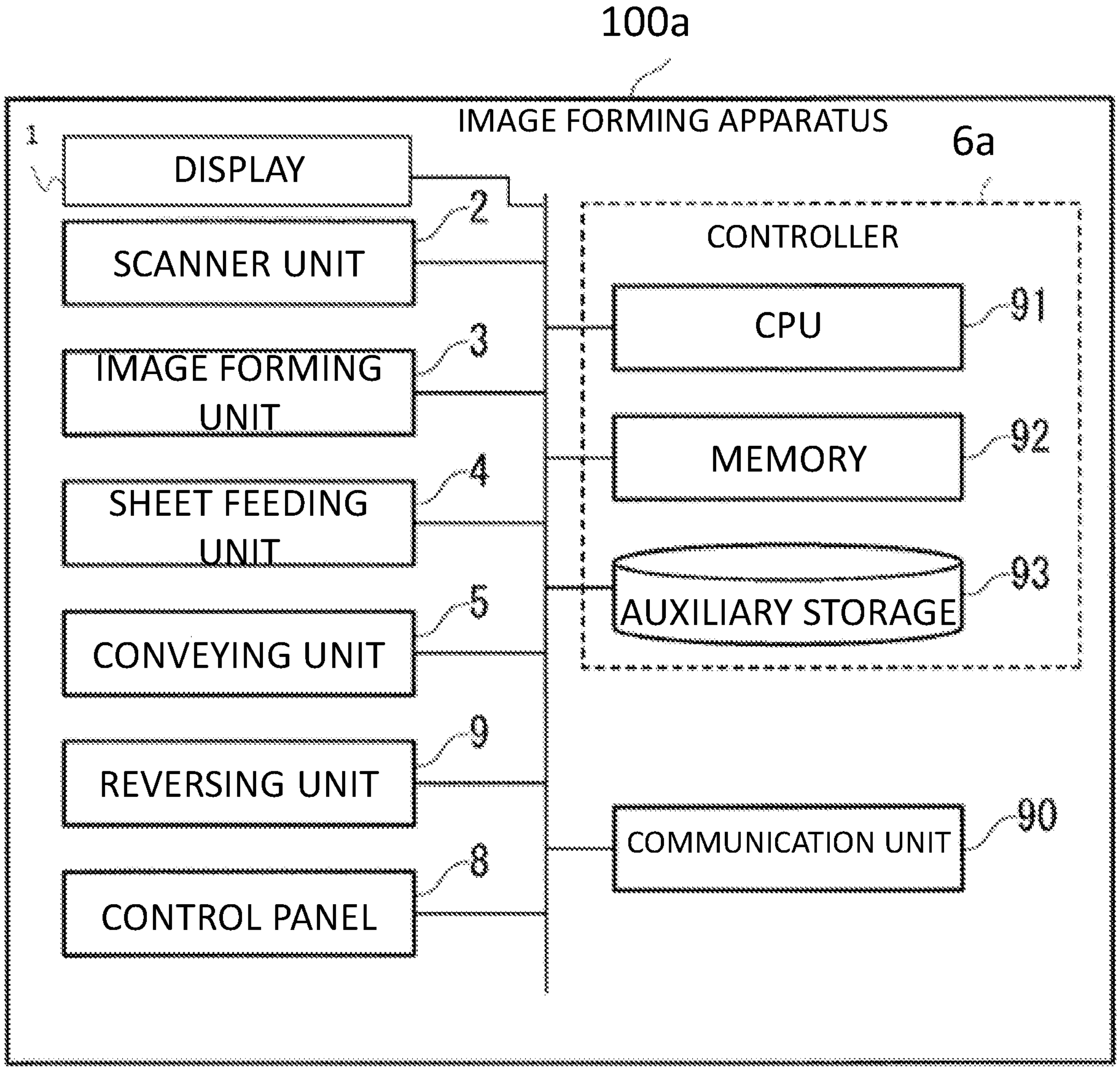
FIG. 11 is a diagram illustrating a hardware configuration of an image forming apparatus according to a second embodiment.

FIG. 11 is a diagram illustrating a hardware configuration of an image forming apparatus 100*a* according to the second embodiment. The image forming apparatus 100*a* is different from the image forming apparatus 100 in that the controller 6 of the image forming apparatus 100 is replaced by a controller 6*a*. In the following description, for the sake of simplicity, the same functions as those of the image forming apparatus 100 are denoted by the same reference numerals as those in FIG. 1 to FIG. 7, and the description thereof will not be repeated.

The controller 6*a* is different from the controller 6 in that the central triac 96*a* and the end triac 96*b* are controlled so as to energize the heating element set 45 during the pre-processing period regardless of the temperatures measured by the heater thermometer 62 and the film thermometer 64.

Based on the temperature measured by the heater thermometer 62, the controller 6*a* determines the energization method for the heating element set 45 in the preprocessing period.

Figure 12:
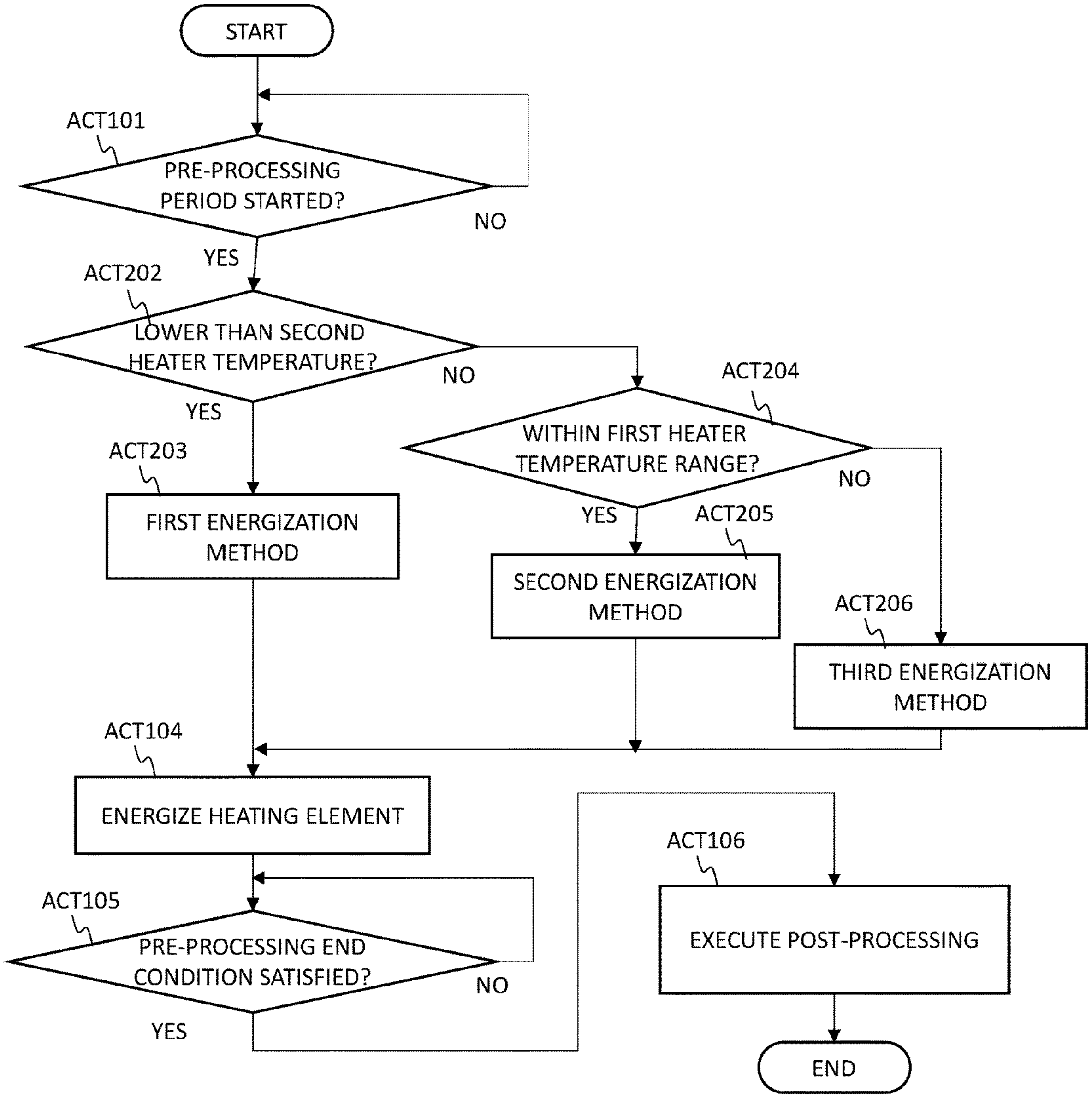
FIG. 12 is a flowchart illustrating processing executed by a controller of the image forming apparatus during a period from the start of the pre-processing period to the execution of the post-processing in the second embodiment.

FIG. 12 is a flowchart showing processing executed by the controller 6*a* in the period from the start of the pre-processing period to the execution of the post-processing in the second embodiment. Hereinafter, for simplicity of description, the same processing as that executed by the controller 6 is denoted by the same reference numerals as those in FIG. 8 and FIG. 9, and description thereof will be omitted.

When the pre-processing period is started in ACT 101 (ACT 101, YES), the controller 6*a* executes the process of ACT 202. When at least one of the temperatures measured by the heater thermometer 62 is equal to or lower than the second heater temperature (ACT 202, YES), the controller 6*a* executes the process of ACT 203, as described in FIG. 9.

On the other hand, when all of the temperatures measured by the heater thermometer 62 are equal to or higher than the second heater temperature (ACT 202, NO), the controller 6*a* executes the process of ACT 204. When all of the temperatures measured by the heater thermometer 62 are within the first heater temperature range (ACT 204, YES), the controller 6*a* executes the process of ACT 205.

On the other hand, when at least one of the temperatures measured by the heater thermometer 62 is not within the first heater temperature range (ACT 204, NO), the controller 6*a* executes the process of ACT 206.

Next to the execution of the process of ACT 203, ACT 205 or ACT 206, the controller 6*a* executes the process of ACT 104. Next to the process of ACT 104, the controller 6*a* executes the process of ACT 105. Next to the process of ACT 105, the controller 6*a* executes the process of ACT 106.

The image forming apparatus 100*a* of the second embodiment configured as described above has the controller 6*a* for controlling the central triac 96*a* and the end triac 96*b* to energize the heating element set 45 before the pressing roller 30*p* is rotated, whereby viscosity of lubricant applied to the inner peripheral surface of the cylindrical film 35 can be reduced before rotation, thereby suppressing occurrence of torque increase. In addition, since the image forming apparatus 100*a* according to the second embodiment is capable of suppressing the occurrence of torque increase, it is possible to appropriately drive the film regardless of the state of use.

Modified Example

Hereinafter, the power supplied to the heating element set 45 by the first energization method during the pre-processing period will be referred to as a first power. Hereinafter, the power supplied to the heating element set 45 by the second energization method during the pre-processing period will be referred to as a second power. Hereinafter, the power supplied to the heating element set 45 by the third energization method during the pre-processing period will be referred to as a third power. The first time period, the second time period and the third time period may not necessarily be the same. The ratio of the first period to the second period may be any value which is equal to a second ratio to a first ratio, where the first ratio is the ratio of the first power to the first duty ratio, and the second ratio is the ratio of the second power to the second duty ratio. The ratio of the third period to the third period may be any value which is equal to a third ratio to the first ratio, where the third ratio is the ratio of the third power to the third duty ratio.

It should be noted that the pre-processing execution condition does not necessarily depend solely on the temperature measured by the film thermometer 64. The pre-processing execution condition is, for example, a condition that at least one of the plurality of heater thermometers 62 is equal to or higher than the first heater temperature.

The controller 6 may energize not the first end heating element 45*b*1 and the second end heating element 45*b* but the central heating element 45*a* in the pre-processing period. In this case, the viscosity of lubricant located at the end portion of the inner peripheral surface of the cylindrical film 35 is higher than the viscosity of lubricant located at the center portion of the inner peripheral surface of the cylindrical film 35. Therefore, the lubricant supplied in this way hardly leaks to the outer side of the cylindrical film 35.

The image forming apparatus 100 may further include an ambient thermometer 65 in addition to the heater thermometer 62 and the film thermometer 64. The ambient thermometer 65 measures ambient temperature of a target object to which the ambient thermometer 65 is attached. When the image forming apparatus 100 includes the ambient thermometer 65, the controller 6 may determine the energization method based on the temperature measured by the heater thermometer 62, the film thermometer 64, and the ambient thermometer 65.

For example, when the temperature measured by the ambient thermometer 65 is higher than a predetermined value, the controller 6 determines, as the pre-processing energization method, a high power pre-processing energization method. In the high power pre-processing energization method, electric power supplied to the heating element set 45 is higher than the electric power supplied when the temperature measured by the ambient thermometer 65 is lower than the predetermined value. Specifically, in the high power pre-processing energization method, the electric power is supplied to the heating element set 45 for a longer time than the electric power supplied when the temperature measured by the ambient thermometer 65 is lower than the predetermined value.

Figure 13:
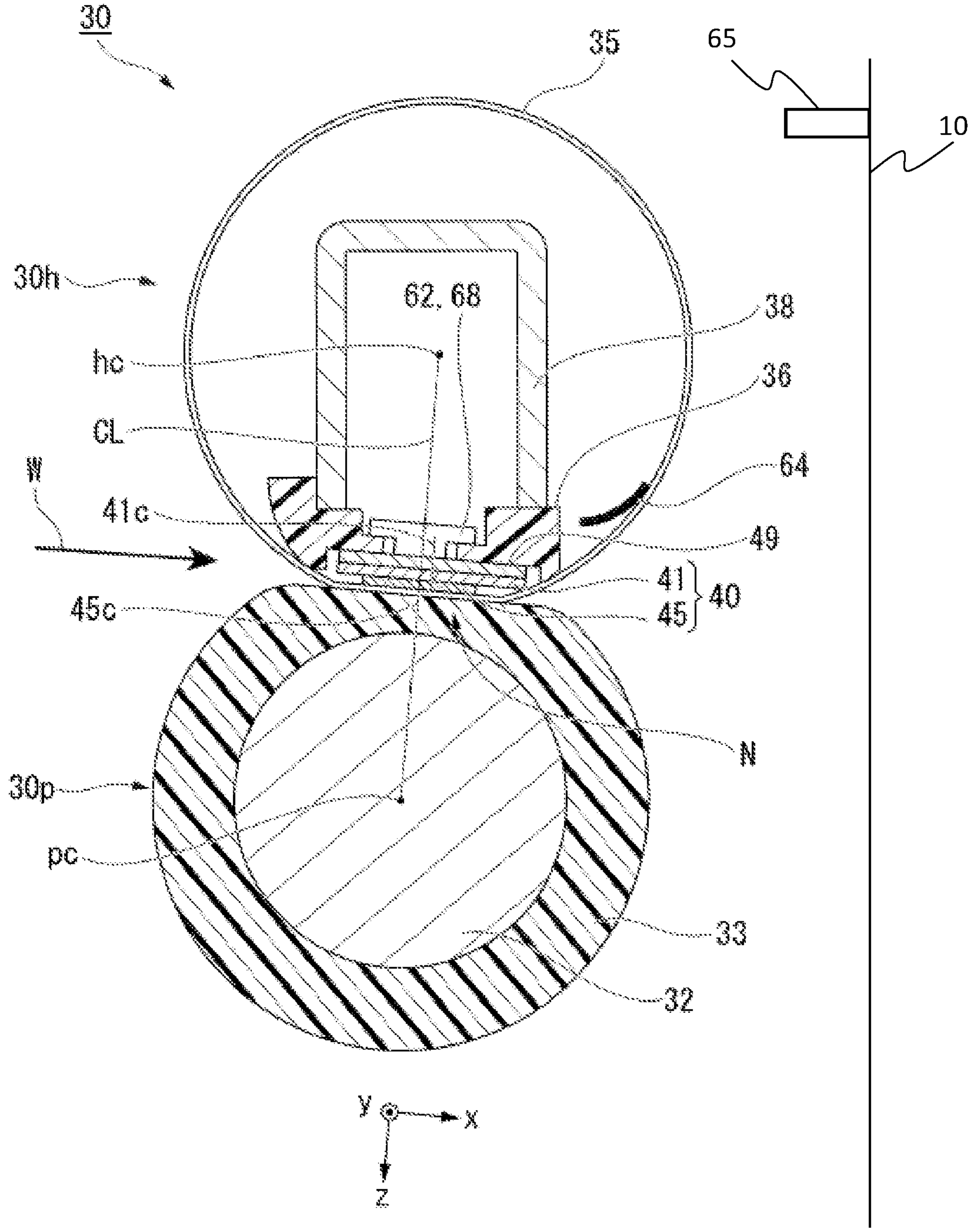
FIG. 13 is a diagram illustrating an ambient thermometer in a modification example.

FIG. 13 is a diagram illustrating the ambient thermometer 65 in the modified example. The ambient thermometer 65 may be attached to any position in the vicinity of the fixing unit 30. The vicinity of the fixing unit 30 is a position where ambient temperature of the fixing unit 30 can be measured by the ambient thermometer 65. The ambient temperature meter 65 may be attached to the housing 10 located outside the film unit 30*h*, for example, as shown in FIG. 13.

Incidentally, the position of the film thermometer 64 may be any position as long as it is located inside the cylindrical film 35 and on the +x direction side of the heater unit 40. The position of the film thermometer 64 may be, for example, a position at which an angle θ formed between a line perpendicular to the inner surface of the contact point with the cylindrical film 35 and a line perpendicular to the nip N is equal to or larger than 45 degrees.

Figure 14:
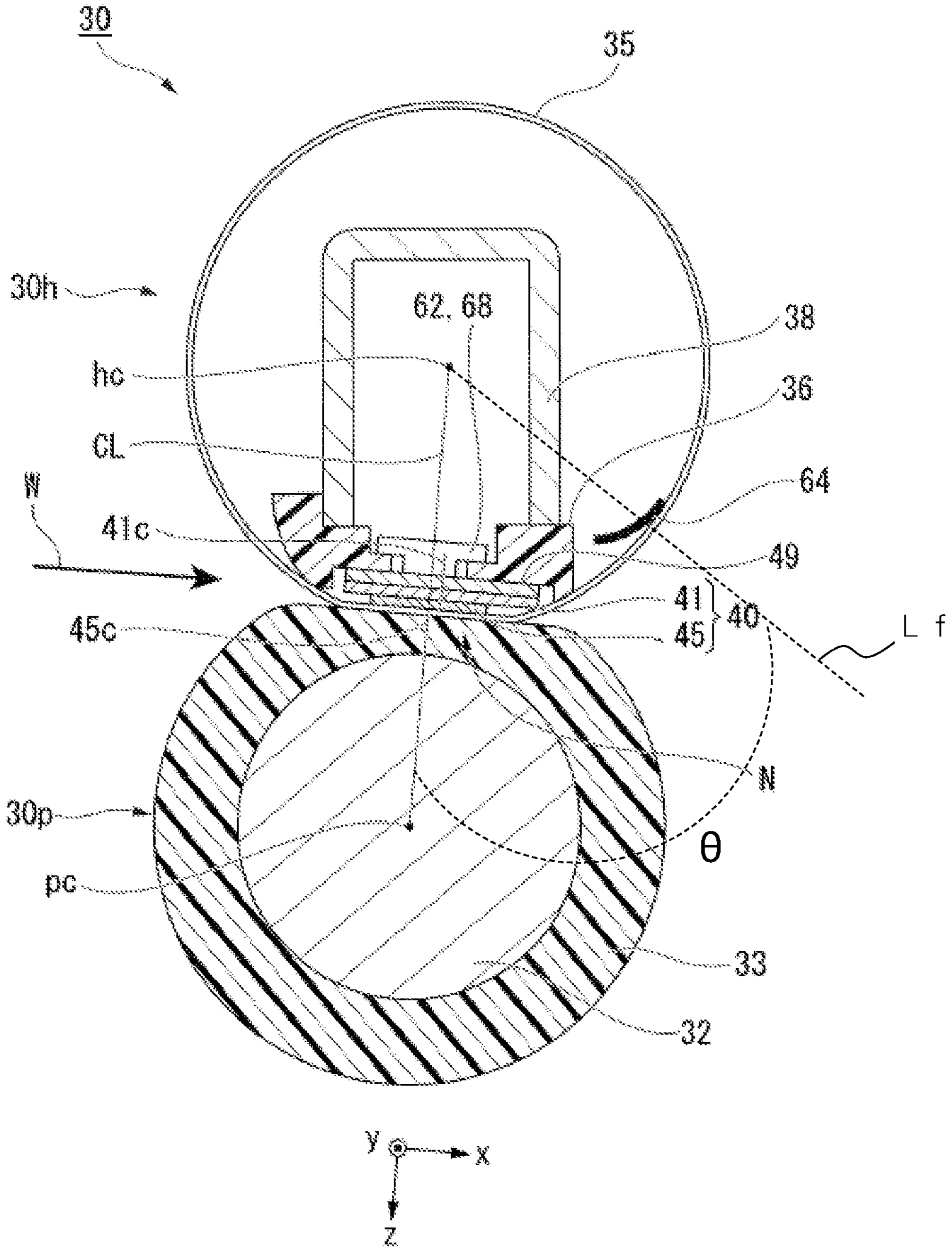
FIG. 14 is a diagram showing an angle θ formed in the modified example.

FIG. 14 is a diagram showing the angle θ formed in the modified example. FIG. 14 shows that the angle θ formed by the straight line Lf perpendicular to the inner surface of the contact point with the cylindrical film 35 and the straight line CL perpendicular to the nip N is equal to or larger than 45 degrees.

Figure 15:
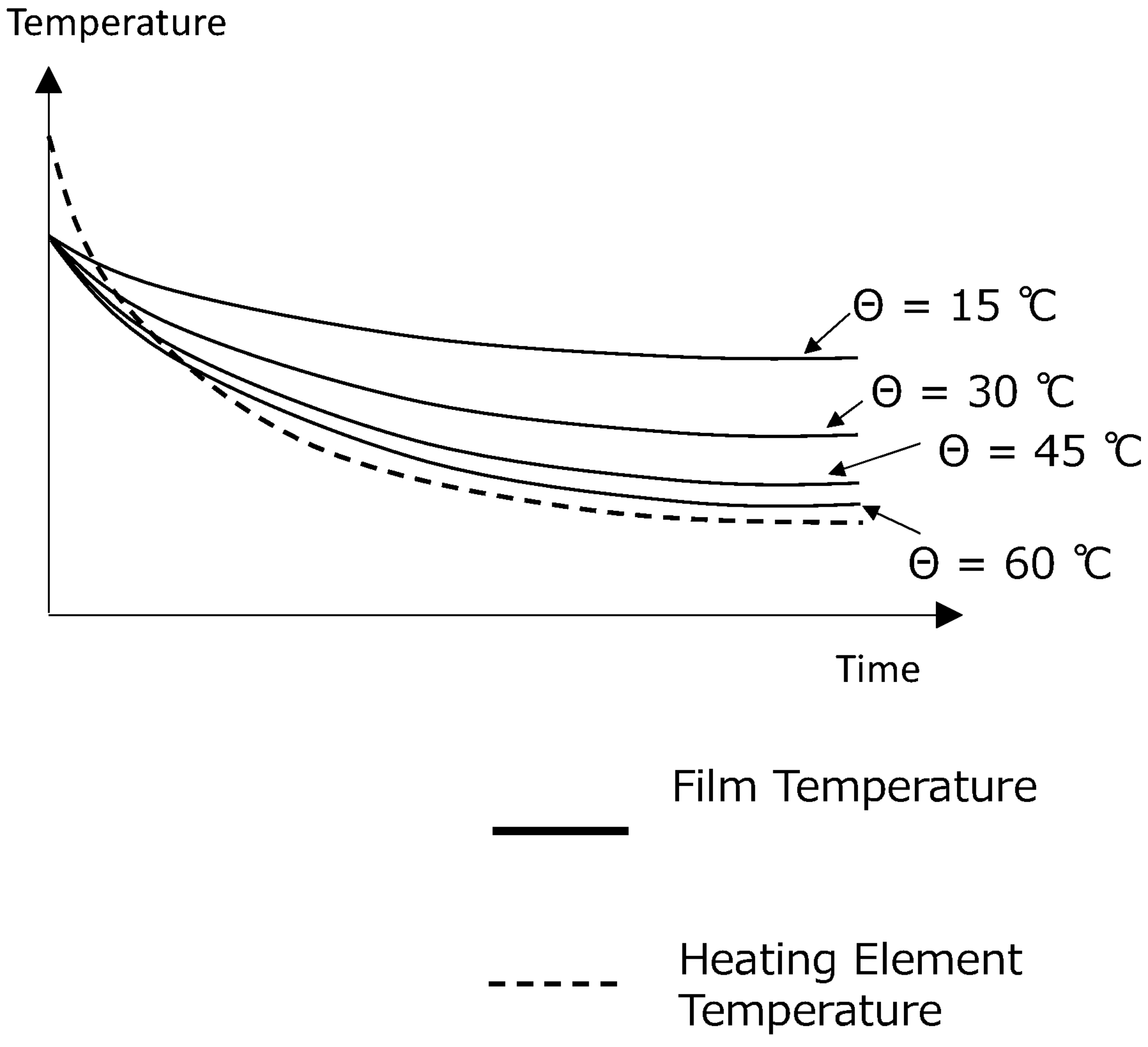
FIG. 15 is a diagram showing a relationship between temperature measured by a film thermometer and temperature of the heating element set for each angle θ in the modification example.

FIG. 15 is a diagram showing a relationship between the temperature measured by the film thermometer 64 and the temperature of the heating element set 45 for each angle θ in the modification example. In FIG. 15, the horizontal axis represents time, and the vertical axis represents temperature. FIG. 15 shows that the longer the angle θ formed by the film thermometer 64 is, the more gradual the temperature of the film thermometer becomes. FIG. 15 shows that the time change of the temperature measured by the film thermometer 64 having the angle θ of 45 degrees or more is approximately equal to that of the temperature of the heating element set in the range of heating element set 45. Therefore, FIG. 15 shows that the image forming apparatus 100 having the angle θ of 45 degrees or more can suppress the occurrence of torque increase more efficiently than the image forming apparatus 100 having the angle θ less than 45 degrees.

The heating element set 45 includes three heating elements (i.e., the central heating element 45*a*, the first end heating element 45*b*1, and the second end heating element 45*b*2). In contrast, the number of heating elements included in the heating element set 45 may be one or two, and may be four or more.

The heater thermometer 62 includes two heater thermometers (i.e., the center heater thermometer 62*a* and the end heater thermometer 62*b*). In contrast, the number of heater thermometers 62 may be three or more.

The plurality of thermostats 68 comprise two thermostats (i.e., the central thermostat 68*a* and the end thermostat 68*b*). In contrast, the number of the plurality of thermostats 68 may be three or more.

In the aforementioned embodiments, the image forming apparatus 100 or 100*a* includes the fixing unit 30. In contrast, the image forming apparatus may be a decoloring apparatus, which has a decoloring unit instead of the fixing unit 30. The decoloring apparatus performs a process of decoloring (i.e., erasing) an image formed on a sheet by a decolorable toner. The decoloring unit heats the decolorable toner image formed on the sheet passing through the nip to decolorize the toner image.

The pre-processing end condition may be, for example, a condition in which at least one of the temperatures measured by the heater thermometers 62 is equal to or greater than a predetermined temperature (hereinafter referred to as a "second pre-processing end condition"). When the pre-processing end condition is the first pre-processing end condition, the occurrence frequency of the situation in which the lubricant is partially fixed is lower than that in the case where the pre-processing end condition is the second pre-processing end condition. Therefore, when the preceding end condition is the first pre-processing end condition, the image forming apparatus 100 can suppress the occurrence of torque increase as compared to the case where the pre-processing end condition is the second pre-processing end condition.

The pre-processing heater condition does not necessarily need to be the first pre-processing heater condition. The pre-processing heater condition may be a condition that all of the temperatures measured by the heater thermometers 62 are lower than the first heater temperature (hereinafter, referred to as "second pre-processing heater conditions"). The second pre-processing heater condition is a condition included in the first pre-processing heater condition. When the pre-processing heater condition is the first pre-processing heater condition, the occurrence frequency of the situation in which the lubricant is partially fixed is lower than that in the case where the pre-processing heater condition is the second pre-processing heater condition. Therefore, when the pre-processing heater condition is the first pre-processing heater condition, the image forming apparatus 100 can suppress the occurrence of torque increase as compared to the case where the pre-processing heater condition is the second pre-processing heater condition.

The pre-processing film condition does not necessarily need to be the first pre-processing film condition. The pre-processing film condition may be a condition in which all of the temperatures measured by the plurality of film thermometers 64 are lower than the film temperature (hereinafter referred to as "second pre-processing film conditions"). The second pre-processing film condition is a condition included in the first pre-processing film condition. When the pre-processing film condition is the first pre-processing film condition, the occurrence frequency of the situation in which the lubricant is partially fixed is lower than that in the case where the pre-processing film condition is the second pre-processing film condition. Therefore, when the pre-processing film condition is the first pre-processing film condition, the image forming apparatus 100 can suppress the occurrence of torque increase as compared with the case where the pre-processing film condition is the second pre-processing film condition.

In ACT 201 shown in FIG. 9 or FIG. 12, the controller 6 does not necessarily have to determine whether or not at least one of the temperatures measured by the film thermometer 64 is lower than the film temperature (hereinafter referred to as "ACT 201 first determination"). In ACT 201, the controller 6 may determine whether or not all of the temperatures measured by the film thermometer 64 are lower than the film temperature (hereinafter referred to as "ACT 201 second determination"). In ACT 201, when the controller 6 executes the ACT 201 first determination, the occurrence frequency of the situation where the lubricant is partially fixed is lower than that in the case where the ACT 201 second determination is performed. Therefore, when the controller 6 executes the ACT 201 first determination in ACT 201, the image forming apparatus 100 can suppress the occurrence of torque increase compared to the case in which the ACT 201 second determination is performed.

In ACT 202 shown in FIG. 9 or FIG. 12, the controller 6 does not necessarily have to determine whether or not at least one of the temperatures measured by the heater thermometer 62 is lower than the second heater temperature (hereinafter referred to as "ACT 202 first determination"). In ACT 202, the controller 6 may determine whether or not all of the temperatures measured by the heater thermometer 62 are lower than the second heater temperature (hereinafter referred to as "ACT 202 second determination"). In ACT 202, when the controller 6 executes the ACT 202 first determination, the occurrence frequency of the situation where the lubricant is partially fixed is lower than that in the case where the ACT 202 second determination is performed. Therefore, when the controller 6 executes the ACT 202 first determination in ACT 202, the image forming apparatus 100 can suppress the occurrence of torque increase compared to the case in which the ACT 202 second determination is performed.

Note that in ACT 204 shown in FIG. 9 or FIG. 12, the controller 6 does not necessarily have to determine whether or not all of the temperatures measured by the heater thermometer 62 are within the first heater temperature range (hereinafter referred to as "ACT 204 first determination"). In ACT 204, the controller 6 may determine whether or not at least one of the temperatures measured by the heater thermometer 62 is within the first heater temperature range (hereinafter referred to as "ACT 204 second determination"). In ACT 204, when the controller 6 executes the ACT 204, the occurrence frequency of the situation where the lubricant is partially fixed is lower than that in the case where the ACT 204 second determination is performed. Therefore, when the controller 6 executes the ACT 204 first determination in ACT 204, the image forming apparatus 100 can suppress the occurrence of torque increase compared to the case in which the ACT 204 second determination is performed.

All or part of the functions of the image forming apparatuses 100 and 100*a* may be performed by any hardware, such as an ASIC (Application Specific Integrated Circuit), a PLD (Programmable Logic Device), or an FPGA (Field Programmable Gate Array). The program may be recorded on a computer-readable recording medium. The computer-readable recording medium is, for example, a flexible disk, a magneto-optical disk, a portable medium such as a ROM, a CD-ROM, or the like, a storage device such as a hard disk incorporated in a computer system, or the like. The program may be transmitted over a telecommunications line.

In the above embodiments, the CPU 91 of the controller 6 executes programs for achieving the functions of the image forming apparatus 100 or 100*a*, but those functions may be implemented by a circuit such as an LSI.

According to at least one embodiment described above, the image forming apparatus 100 and 100*a* may have the controller 6 or the controller 6*a* for controlling the central triac 96*a* and the end triac 96*b* to energize the heating element set 45 before rotating the pressing roller 30*p*, thereby reducing viscosity of lubricant applied to the inner peripheral surface of the cylindrical film 35 before rotation and suppressing torque increase. Further, since the image forming apparatus 100 and the image forming apparatus 100*a* can suppress the occurrence of torque increase, the film can be appropriately driven regardless of the state of use.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An image forming apparatus comprising:
- a fixing unit including:
  - a heater including a first surface and a second surface opposite to the first surface,
  - a fixing belt having a surface to which a lubricant is applied and contacting the first surface of the heater through the lubricant,
  - a heat conductor contacting the second surface of the heater, and
  - a pressing roller capable of pressing and rotating the fixing belt;
- a power supply configured to supply electric power to the heater;
- a first thermometer configured to measure a temperature of the heat conductor; and
- a controller configured to control the power supply, wherein the controller, before controlling the pressing roller to rotate, controls the power supply to supply to the heater:
  - a first amount of electric power when the temperature of the heat conductor is lower than a first value,
  - a second amount of electric power less than the first amount when the temperature of the heat conductor is higher than or equal to the first value and lower than or equal to a second value which is higher than the first value, and
  - a third amount of electric power less than the second amount when the temperature of the heat conductor is higher than the second value.

2. The image forming apparatus according to claim 1, wherein
- the heater further includes a first heating element to which the electric power is supplied.

3. The image forming apparatus according to claim 2, further comprising:
- a second thermometer configured to measure a temperature of the first heating element.

4. The image forming apparatus according to claim 3, wherein
- the first heating element is disposed at a central portion in a longitudinal direction of the heater.

5. The image forming apparatus according to claim 4, wherein
- the heater further includes a second heating element arranged adjacent to the first heating element in the longitudinal direction.

6. The image forming apparatus according to claim 5, wherein
- the second thermometer and the first heating element overlap each other when viewed in a first direction perpendicular to a surface of the fixing belt.

7. The image forming apparatus according to claim 6, further comprising:
- a third thermometer configured to measure a temperature of the second heating element.

8. The image forming apparatus according to claim 7, wherein
- the third thermometer and the second heating element overlap each other when viewed in the first direction.

9. The image forming apparatus according to claim 8, wherein
- the controller controls the power supply to supply electric power to the first heating element and to not supply electric power to the second heating element before controlling the pressing roller to rotate.

10. The image forming apparatus according to claim 8, wherein the heater further includes a third heating element arranged adjacent to the first heating element on an opposite side of the second heating element, and the image forming apparatus further comprises:

a first thermostat arranged so as to overlap the first heating element when viewed in the first direction and configured to turn off electric power supplied to the first heating element when the temperature of the first heating element exceeds a predetermined temperature, and a second thermostat arranged so as to overlap the third heating element when viewed in the first direction and configured to turn off electric power supplied to the third heating element when a temperature of the third heating element exceeds the predetermined temperature.

11. A method for controlling a fixing unit of an image forming apparatus, the fixing unit including a heater including a first surface and a second surface opposite to the first surface, a fixing belt having a surface to which a lubricant is applied and contacting the first surface of the heater through the lubricant, a heat conductor contacting the second surface of the heater, and a pressing roller capable of pressing and rotating the fixing belt, the method comprising:

measuring a temperature of the heat conductor; and before rotating the pressing roller, supplying to the heater:

a first amount of electric power when the temperature of the heat conductor is lower than a first value, a second amount of electric power less than the first amount when the temperature of the heat conductor is higher than or equal to the first value and lower than or equal to a second value which is higher than the first value, and a third amount of electric power less than the second amount when the temperature of the heat conductor is higher than the second value.

12. The method according to claim 11, further comprising:

measuring a temperature of a first heating element included in the heater.

13. The method according to claim 12, wherein the temperatures of the heat conductor and the first heating element are measured by first and second thermometers, respectively.

14. The method according to claim 13, wherein the first heating element is disposed at a central portion in a longitudinal direction of the heater.

15. The method according to claim 14, wherein the heater further includes a second heating element arranged adjacent to the first heating element in the longitudinal direction.

16. The method according to claim 15, wherein the second thermometer and the first heating element overlap each other when viewed in a first direction perpendicular to a surface of the fixing belt.

17. The method according to claim 16, further comprising:

measuring a temperature of the second heating element by a third thermometer.

18. The method according to claim 17, wherein the third thermometer and the second heating element overlap each other when viewed in the first direction.

19. The method according to claim 18, wherein the electric power is supplied to the first heating element and is not supplied to the second heating element before the pressing roller is rotated.

20. The method according to claim 18, wherein the heater further includes a third heating element arranged adjacent to the first heating element on an opposite side of the second heating element, and the method further comprises:

turning off electric power supplied to the first heating element by a first thermostat arranged so as to overlap the first heating element when viewed in the first direction when the temperature of the first heating element exceeds a predetermined temperature, and turning off electric power supplied to the third heating element by a second thermostat arranged so as to overlap the third heating element when viewed in the first direction when a temperature of the third heating element exceeds the predetermined temperature.

* * * * *